(12) United States Patent
Harutyunyan et al.

(10) Patent No.: US 11,616,221 B2
(45) Date of Patent: Mar. 28, 2023

(54) METHOD FOR BATTERY TAB ATTACHMENT TO A SELF-STANDING ELECTRODE

(71) Applicant: HONDA MOTOR CO., LTD., Tokyo (JP)

(72) Inventors: Avetik Harutyunyan, Santa Clara, CA (US); Oleg Kuznetsov, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/393,893

(22) Filed: Aug. 4, 2021

(65) Prior Publication Data
US 2021/0367225 A1    Nov. 25, 2021

Related U.S. Application Data

(62) Division of application No. 16/123,935, filed on Sep. 6, 2018, now Pat. No. 11,201,318.
(Continued)

(51) Int. Cl.
*H01M 50/531* (2021.01)
*H01M 4/04* (2006.01)
(Continued)

(52) U.S. Cl.
CPC ....... *H01M 4/0469* (2013.01); *H01M 4/0419* (2013.01); *H01M 4/131* (2013.01);
(Continued)

(58) Field of Classification Search
CPC .. H01M 4/0469; H01M 4/0419; H01M 4/131; H01M 4/133; H01M 4/134; H01M 4/136; H01M 4/139; H01M 4/362; H01M 4/625; H01M 2004/021; H01M 50/531; H01M 50/116; H01M 50/543
See application file for complete search history.

(56) References Cited

U.S. PATENT DOCUMENTS 3,513,034 A    5/1970    Fischbach et al.
3,772,084 A    11/1973   Scholle
(Continued)

FOREIGN PATENT DOCUMENTS

CN    1922347 A    2/2007
CN    1972739 A    5/2007
(Continued)

OTHER PUBLICATIONS

Communication dated Jan. 27, 2022, from the State Intellectual Property Office of People's Republic of China in related Application No. 201710150360.3.
(Continued)

*Primary Examiner* — Jane J Rhee
(74) *Attorney, Agent, or Firm* — ArentFox Schiff LLP; Mark Duell

(57) ABSTRACT

The present disclosure is directed to methods of securing battery tab structures to binderless, collectorless self-standing electrodes, comprising electrode active material and carbon nanotubes and no foil-based collector, and the resulting battery-tab secured electrodes. Such methods and the resulting battery tab-secured electrodes may facilitate the use of such composites in battery and power applications.

10 Claims, 24 Drawing Sheets

Related U.S. Application Data

(60) Provisional application No. 62/559,254, filed on Sep. 15, 2017.

(51) Int. Cl.

| | | |
|---|---|---|
| *H01M 4/62* | (2006.01) | |
| *H01M 4/36* | (2006.01) | |
| *H01M 4/139* | (2010.01) | |
| *H01M 4/133* | (2010.01) | |
| *H01M 4/136* | (2010.01) | |
| *H01M 4/131* | (2010.01) | |
| *H01M 4/134* | (2010.01) | |
| *H01M 50/119* | (2021.01) | |
| *H01M 50/129* | (2021.01) | |
| *H01M 50/121* | (2021.01) | |
| *H01M 50/536* | (2021.01) | |
| *H01M 4/02* | (2006.01) | |
| *B82Y 30/00* | (2011.01) | |

(52) U.S. Cl.
CPC ............ *H01M 4/133* (2013.01); *H01M 4/134* (2013.01); *H01M 4/136* (2013.01); *H01M 4/139* (2013.01); *H01M 4/362* (2013.01); *H01M 4/625* (2013.01); *H01M 50/119* (2021.01); *H01M 50/121* (2021.01); *H01M 50/129* (2021.01); *H01M 50/536* (2021.01); *B82Y 30/00* (2013.01); *H01M 2004/021* (2013.01)

(56) References Cited

U.S. PATENT DOCUMENTS

| | | |
|---|---|---|
| 4,119,771 A | 10/1978 | Saridakis |
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,658,651 B2 | 5/2020 | Pierce et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2009/0317710 A1 | 12/2009 | Douglas et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0096465 A1 | 4/2011 | Zhou et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0177393 A1 | 7/2011 | Park et al. |
| 2011/0281156 A1 | 11/2011 | Boren et al. |
| 2011/0311874 A1 | 12/2011 | Zhou et al. |
| 2012/0105370 A1 | 5/2012 | Moore |
| 2012/0107683 A1 | 5/2012 | Kim et al. |
| 2012/0121986 A1 | 5/2012 | Balu et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |

(56) References Cited

U.S. PATENT DOCUMENTS

| | | |
|---|---|---|
| 2013/0323583 A1 | 12/2013 | Phares |
| 2014/0005960 A1 | 1/2014 | Anderson et al. |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0093769 A1 | 4/2014 | Busnaina et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0393486 A1 | 12/2019 | He et al. |
| 2020/0006772 A1 | 1/2020 | Yu et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 101627494 A | 1/2010 |
| CN | 101801394 A | 8/2010 |
| CN | 101809790 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 102856579 A | 1/2013 |
| CN | 102945947 A | 2/2013 |
| CN | 103204492 A | 7/2013 |
| CN | 102674316 B | 5/2014 |
| CN | 104064725 A | 9/2014 |
| CN | 204072059 U | 1/2015 |
| CN | 104752651 A | 7/2015 |
| CN | 103219467 B | 11/2015 |
| CN | 103715394 B | 1/2016 |
| CN | 105513823 A | 4/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 106602012 A | 4/2017 |
| CN | 104362326 B | 8/2017 |
| CN | 107004827 A | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |

(56) References Cited

FOREIGN PATENT DOCUMENTS

| | | |
|---|---|---|
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |
| WO | WO 2011/030821 A1 | 3/2011 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |
| WO | WO 2018/194415 A1 | 10/2018 |
| WO | WO 2019/027147 A1 | 2/2019 |

OTHER PUBLICATIONS

Communication dated Mar. 22, 2022, from the Japanese Patent Office in counterpart application No. 2018-142355.
Ying Shi et al., "Graphene-based integrated electrodes for flexible lithium ion batteries", 2D Materials 2 (2015): 024004. (Year: 2015), (9 Pages Total).
Communication dated May 6, 2022, from the State Intellectual Property Office of People's Republic of China in Chinese Application No. 201710150360.3.
Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).
Yurong Liu, "Applications of Carbon Materials in Supercapacitor", National Defense Industry Press,(p. 142, 2 pages total), Jan. 2013. (Cited in CN Application No. 201710150360.3, dated May 6, 2022).
Office Action dated Jun. 28, 2022, issued by the Korean Patent Office in Korean Application No. 10-2022-0057879.
Aminy E. Ostfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
Communication dated Nov. 9, 2021, from the Japanese Patent Office in related application No. 2018-172178.
Communication dated Feb. 23, 2022, from the State Intellectual Property Office of People's Republic of China in Application No. 202010079226.0.
Communication dated Mar. 22, 2022, from the State Intellectual Property Office of People's Republic of China in Application No. 201811076414.7.
Communication dated Sep. 26, 2021, issued by the Korean Intellectual Property Office in related Korean Application No. 10-2018-0058433.
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A. J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co-Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in related European Application No. 18194454.7.
Danafar, F. et al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in related European Application No. 18184002.6 dated Nov. 30, 2018.
Extended European Search Report issued in related European Patent Application No. 18194469.5 dated Dec. 4, 2018.
Hasegawa Kei et al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in related International Application No. PCT/US 19/49923, dated Jan. 23, 2020.
Jenax Inc., Flexible Lithium Polymer Battery J . Flex, Copyright 2014, (6 Pages Total).
Joo-Seong Kim et al., Supporting Information, A Half Millimeter Thick Coplanar Flexible Battery with Wireless Recharging Capability, Nano Letters 2015 15 (4), 9 Pages Total, (2015).
Kim et al., "A Half Millimeter Thick Coplanar Flexible Battery with Wireless Recharging Capability", Nano Letters, American Chemical Society, 2015, (9 Pages Total).
Kun Kelvin Fu et al., "Flexible Batteries: From Mechanics to Devices", 2016 American Chemical Society, ACS Publications, ACS Energy Letters 1, pp. 1065-1079, (2016).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).

(56) References Cited

OTHER PUBLICATIONS

Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sau Yen Chew et al., "Flexible free-standing carbon nanotube films for model lithium-ion batteries", Carbon 47, pp. 2976-2983, (2009).
Sebastian Anthony, LG produces the first flexible cable-type lithium-ion battery, ExtremeTech, Aug. 30, 2012, (9 Pages Total).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
The Extended European Search Report issued in related European Patent Application No. 18186402.6 dated Oct. 11, 2018.
The Swatch Group Ltd., A revolutionary battery by Belenos: The Watchmaker Swatch Group Has Signed an Agreement With the Chinese Geely Group for Use of Its Innovative New Battery., as accessed on May 29, 2019, (3 Pages Total), https://www.swatchgroup.com/en/swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q. et. al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Communication dated Aug. 26, 2019, from the European Patent Office in related European Application No. 18186402.6.
Communication dated Dec. 22, 2020, from the Japanese Patent Office in related application No. 2020-002026.
Communication dated Feb. 4, 2020, from the European Patent Office in related European Application No. 18 173 644.8.
Communication dated Jan. 6, 2021, from the Japanese Patent Office in related application No. 2020-002545.
Communication issued by International Searching Authority in related International Application No. PCT/US19/49923, dated Nov. 13, 2019 (PCT/ISA/206).
David Schiller, "Development of a Stretchable Battery Pack for Wearable Applications", submitted by David Schiller, BSc., Johannes Kepler University Linz, Diss. Universit't Linz, Nov. 2019, 28 Pages Total, https://epub.jku.at/obvulihs/content/titleinfo/4605900/full.pdf.
Extended European Search Report issued in related European Patent Application No. 18173644.8 dated Oct. 12, 2018.
Extended Search Report of related EP Application No. 18 19 4454 dated Jul. 23, 2019.
International Search Report and Written Opinion, issued by International Searching Authority in related International Application No. PCT/US2020/020993, dated Jul. 2, 2020.
International Search Report and Written Opinion, issued by International Searching Authority in related International Application No. PCT/US2020/039821, dated Sep. 30, 2020.
International Search Report and Written Opinion, issued by International Searching Authority in related International Application No. PCT/US2020/043017, dated Dec. 14, 2020.
O.M. Marago, et al., "Optical trapping of carbon nanotubes", Physica E, 40 (2008), pp. 2347-2351.
Office Action issued by the European Patent Office in related European Patent Application No. 18184002.6, dated May 13, 2020.
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
First Office Action dated Aug. 25, 2022, from the State Intellectual Property Office of People's Republic of China in Application No. 201810503719.5.
Ling-ling Gu et al., "Preparation and Applications of Carbon Nanotube/Polymer Composites", Polymer Materials Science and Engineering, vol. 25, No. 11, (Nov. 2009), (5 Pages Total, abstract on p. 5).
Communication dated Oct. 19, 2022, from the State Intellectual Property Office of People's Republic of China in Application No. 201811076414.7.
Cha, Seung I., et al., "Mechanical and electrical properties of cross-linked carbon nanotubes." Carbon 46.3 (2008): pp. 482-488 (Year: 2008).
Communication dated Oct. 9, 2022, from the Chinese Patent Office in Chinese Application No. 202010002766.9.
Communication dated Nov. 11, 2022, from the Chinese Patent Office in Chinese Application No. 202010079226.0.
Definition of "homogeneous", accessed online at https://ahdictionary.com/word/search.html?q=homogeneous on Jan. 12, 2023 (Year: 2023). (3 Pages Total).
Definition of "in situ", accessed online at https://ahdictionary.com/word/search.html?q=in+situ on Jan. 11, 2023 (Year: 2023). (3 Pages Total).

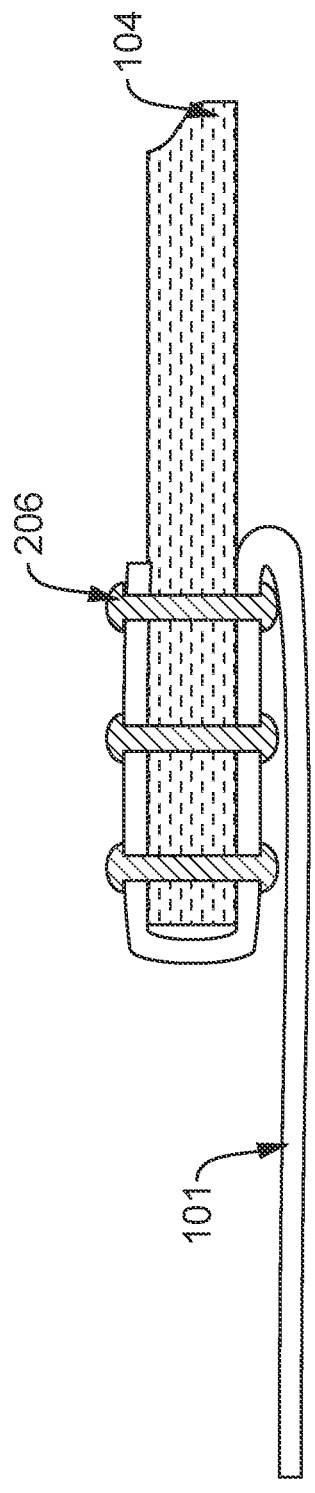
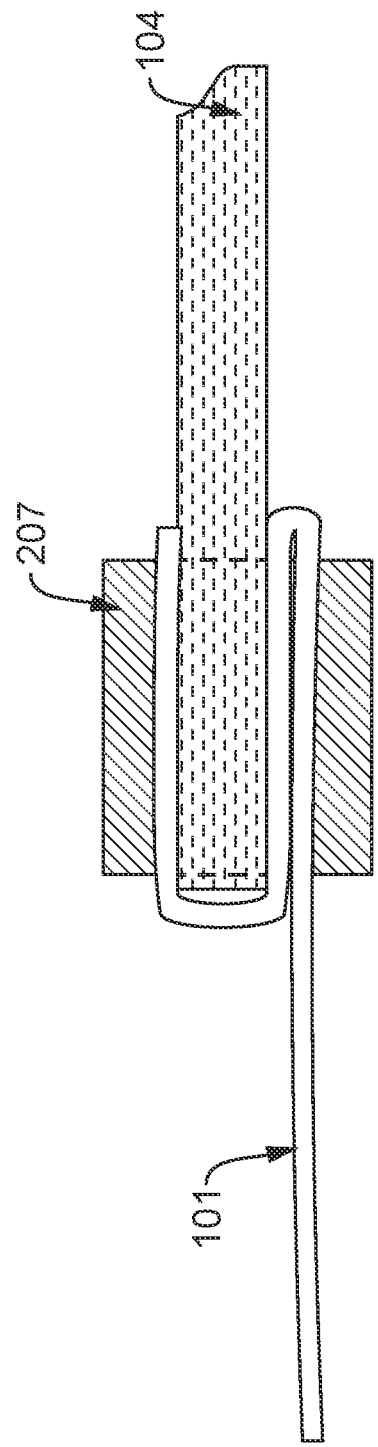
FIG. 2A
FIG. 2B

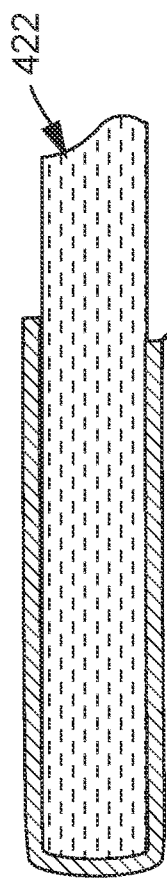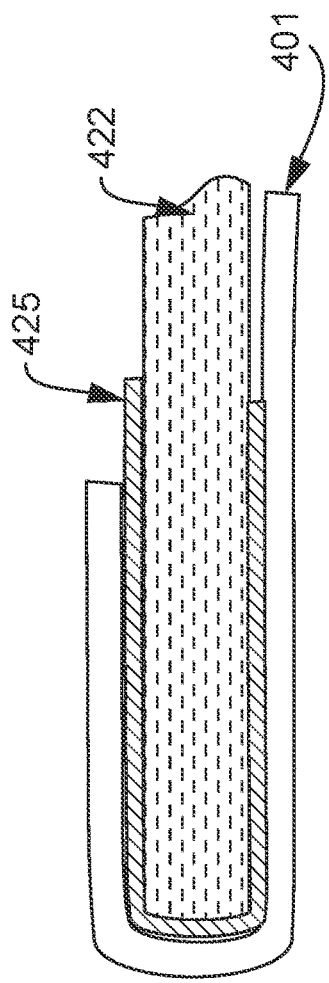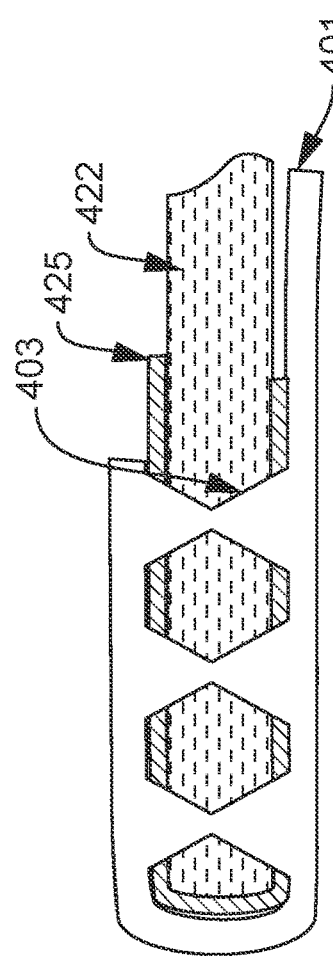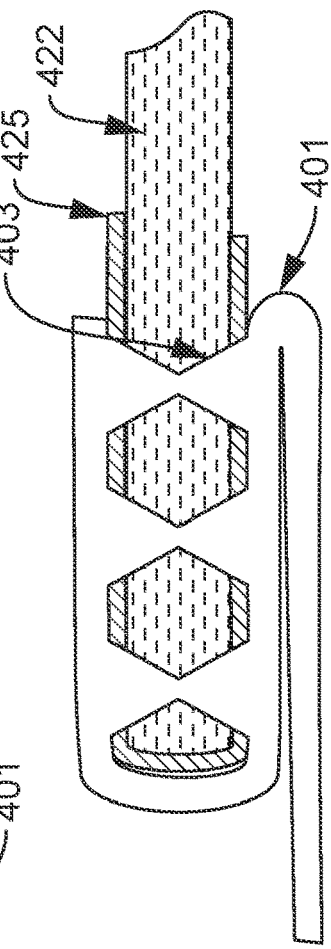

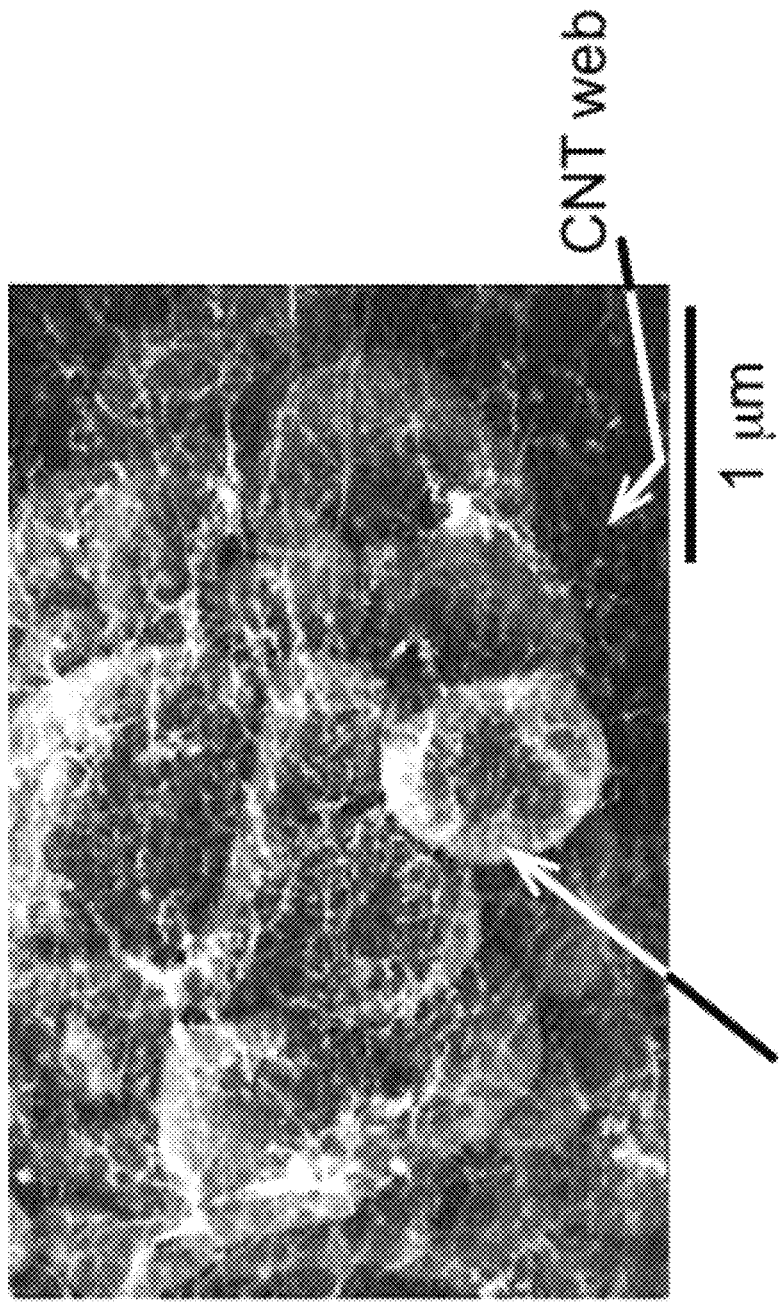

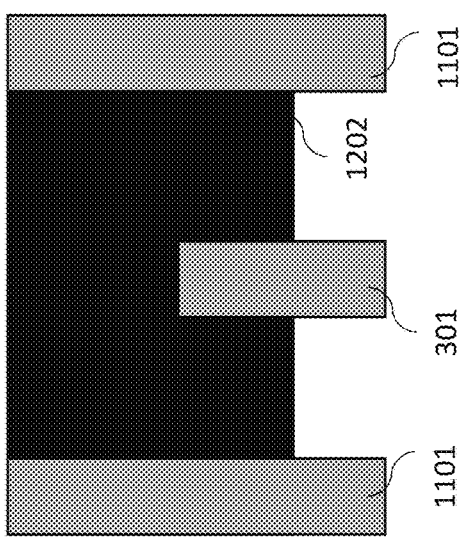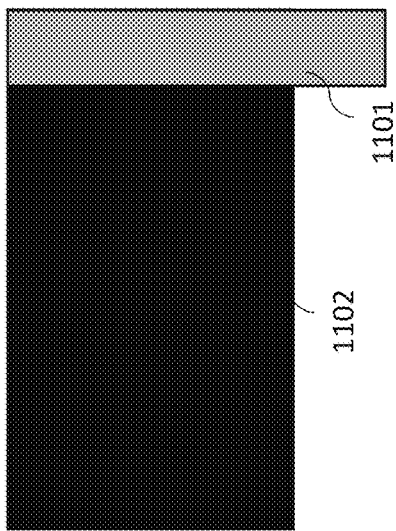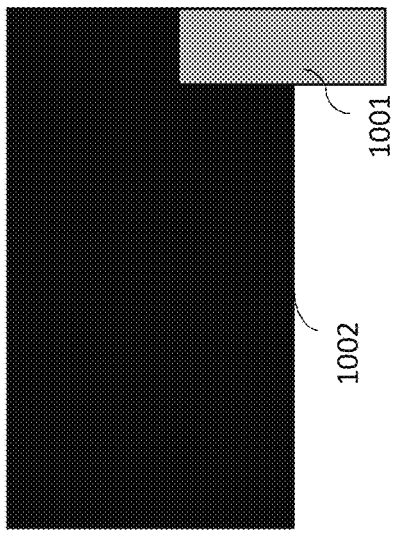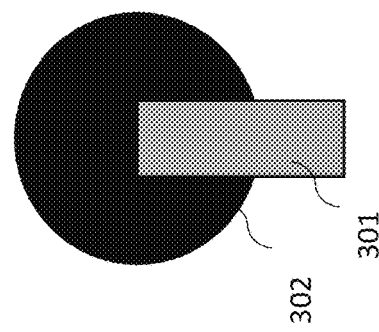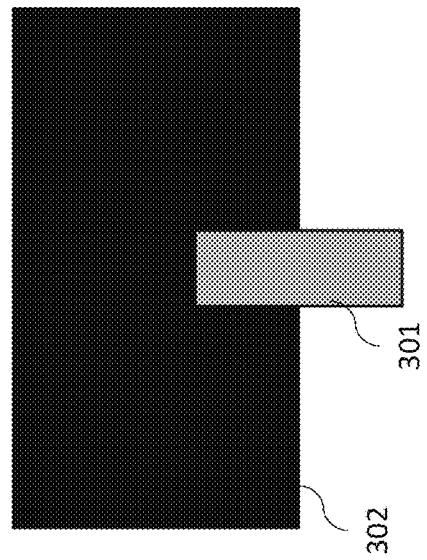

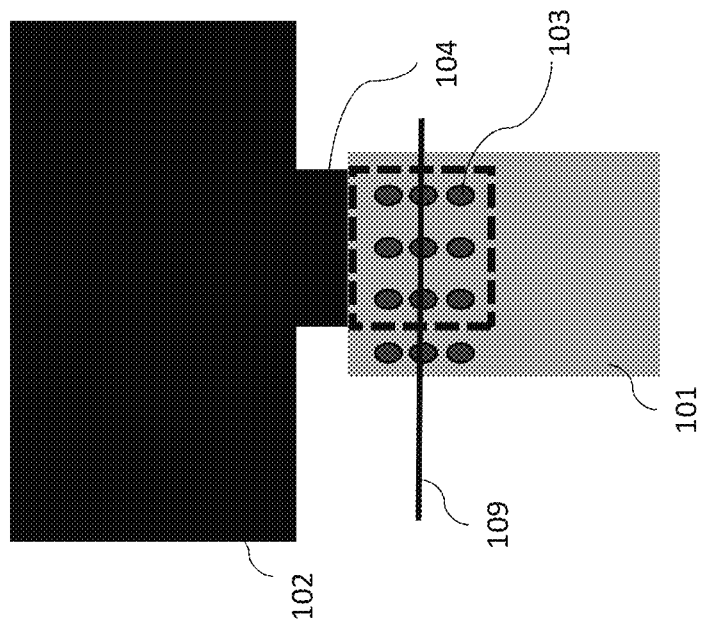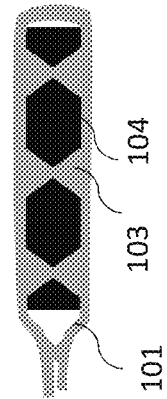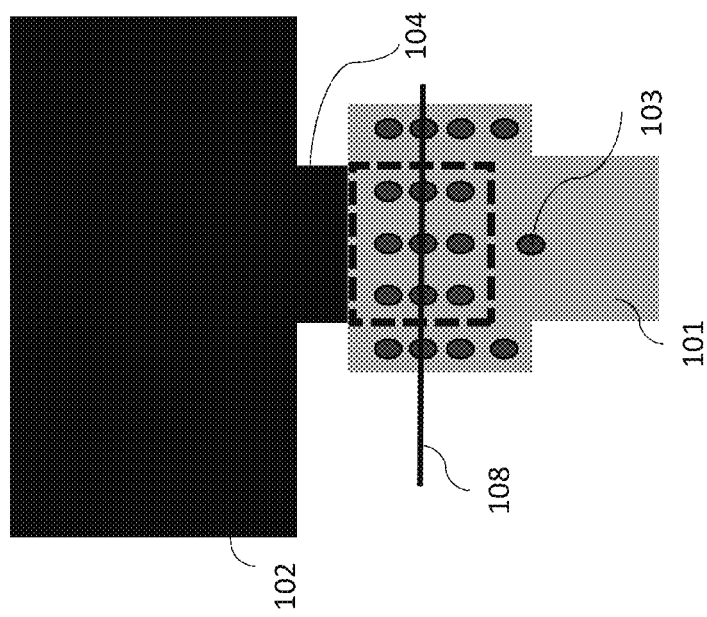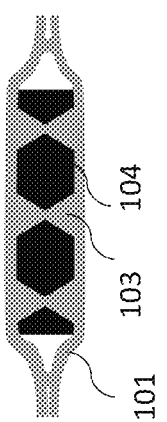

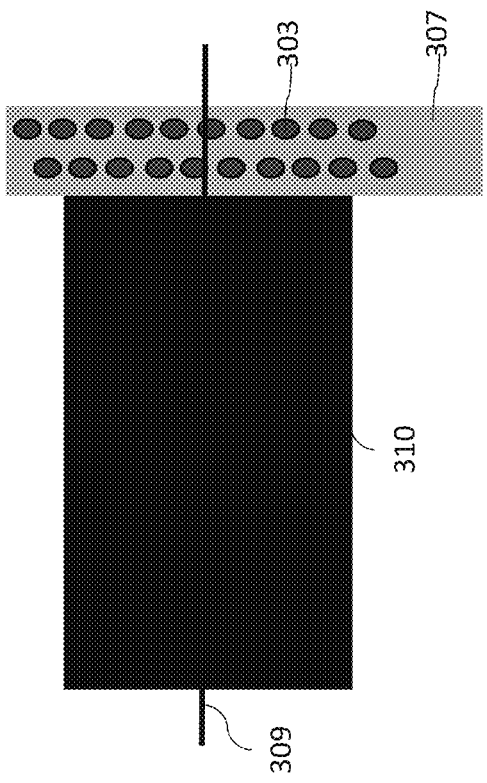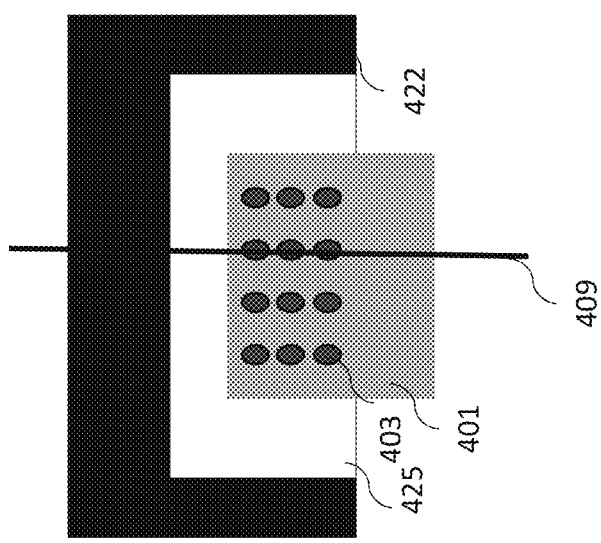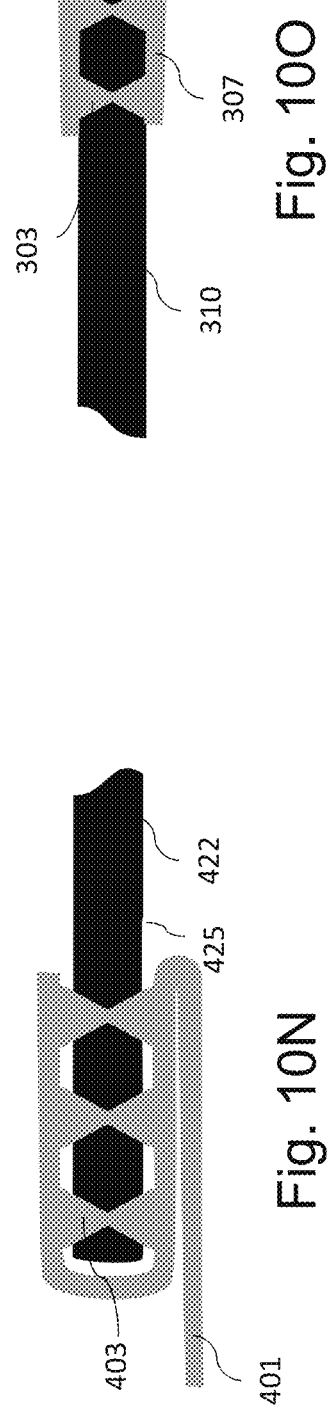

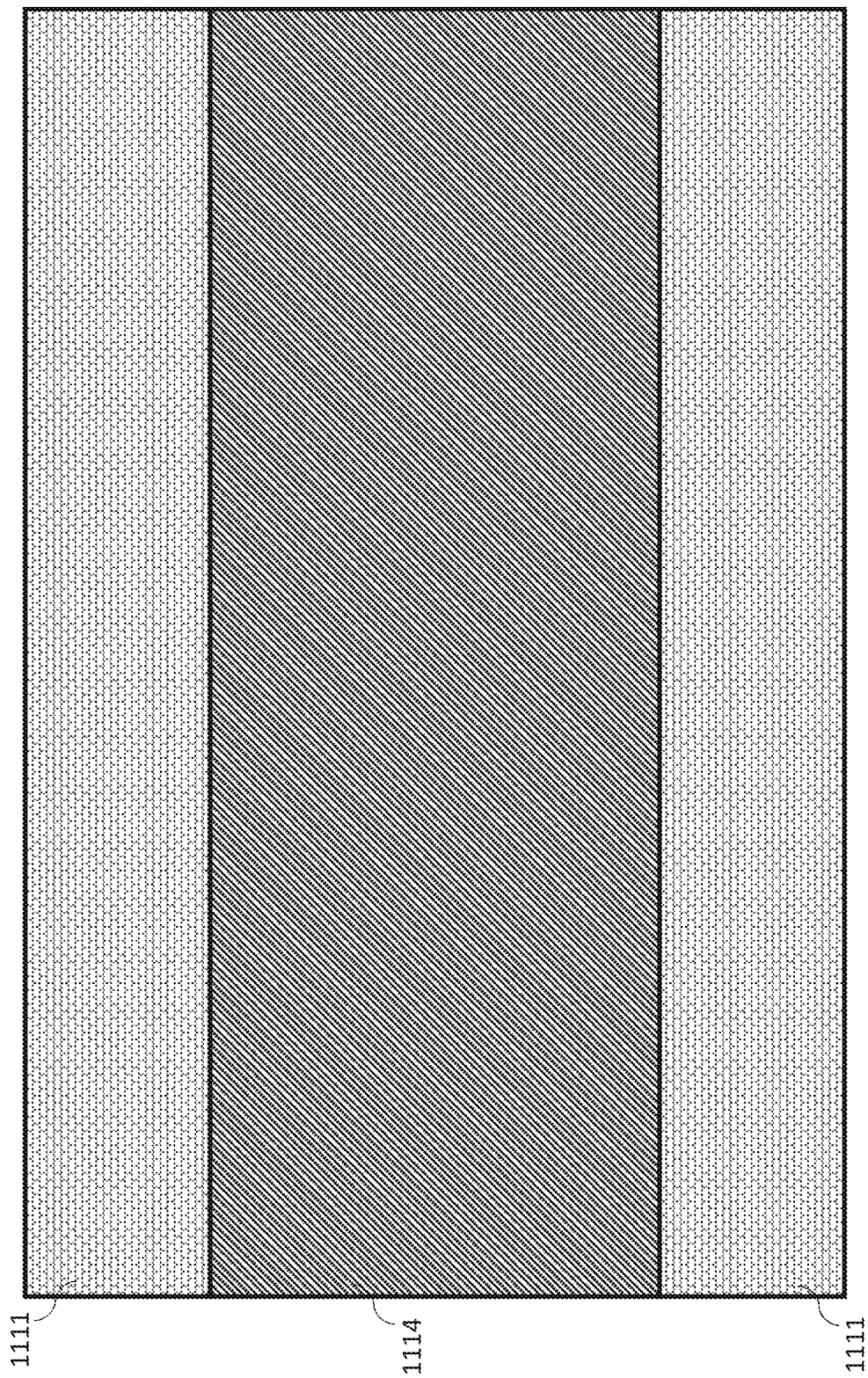

METHOD FOR BATTERY TAB ATTACHMENT TO A SELF-STANDING ELECTRODE

CROSS-REFERENCE TO RELATED APPLICATIONS

This application is a Divisional application of U.S. patent application Ser. No. 16/123,935, entitled "Method for Battery Tab Attachment to a Self-Standing Electrode," filed on Sep. 6, 2018, which claims priority to U.S. Patent Application No. 62/559,254, entitled "Method and Structure for Battery Tab Attachment to a Self-Standing Electrode Without Current Collector or Binder," filed on Sep. 15, 2017. The prior applications are incorporated herein by reference in their entireties.

BACKGROUND

A Li-ion battery consists of two electrodes (anode and cathode), a membrane separating anode from cathode, and electrolyte. Electrodes consist of an active material, a binder, a carbon-based additive and current collectors. Aluminum/Copper foils are typical current collectors for Li-ion batteries. Usually, the active material is printed on the surface of the current collectors using a slurry consisting of the active material, the additive, a binder, and a proper solvent. After preparation of the electrode, an electrically conductive tab is attached to the current collector to get the current out of the battery. Commonly, the tab is a strip of aluminum/copper/nickel foil, which is welded to the current collector foil of the electrodes.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In the case of self-standing electrodes, free of binder and comprising the active material powder in a carbon nanotube matrix, and in which no collector foil is present, a method is needed for transporting the current from the electrodes. In other words, it is necessary to solve the problem of tab attachment to the electrode, which does not have any current collector foils.

In some embodiments, the present disclosure is directed to a self-standing electrode comprising: a body comprising a composite material having electrode active material particles in a three-dimensional cross-linked network of carbon nanotubes; a member extending outward from the body, the member comprising the composite material; and a battery tab secured to the member.

In some embodiments, the present disclosure is directed to a method of making a self-standing electrode, the method comprising: aerosolizing or fluidizing an electrode active material to produce an aerosolized or fluidized electrode active material; and co-depositing the aerosolized or fluidized electrode active material and carbon nanotubes to form a self-standing electrode; and securing a battery tab to the electrode such that each of at least a first face and a second face of the electrode is in contact with the battery tab.

In some embodiments, the present disclosure is directed to a self-standing electrode comprising: a self-standing body that is free of a binder and comprises a composite material having electrode active material particles in a three-dimensional cross-linked network of carbon nanotubes, wherein the self-standing body includes a first face and a second face opposite the first face; and a battery tab secured to the self-standing body that comprises: a body; a first leg extending from the body of the battery tab; and a second leg extending from the body of the battery tab, wherein the self-standing electrode body is positioned between the first leg and the second leg, and the first leg contacts the first face of the self-standing body and the second leg contacts the second face of the self-standing body.

These and other aspects of the invention will become more fully understood upon a review of the detailed description, which follows.

BRIEF DESCRIPTION OF THE DRAWINGS

FIG. 2A shows a schematic of a battery tab attached to a protruding member of a self-standing electrode using rivets or staples according to some aspects of the present disclosure.

FIG. 2B shows a side view of a schematic of a battery tab attached to a protruding member of a self-standing electrode using a clamp according to some aspects of the present disclosure.

FIGS. 3D and 3E are cross-sections along the line 308 at FIG. 3C. FIG. 3G is a cross-section along the line 309 at FIG. 3F.

FIGS. 4A-4D show a schematic of a method of multilayer tab attachment according to some aspects of the present disclosure.

FIG. 9 is a magnified overhead view of the treated self-standing electrode shown in FIG. 8.

FIGS. 10A-10E show schematics of example geometries of battery tab attachment to self-standing electrodes, according to some aspects of the present disclosure.

FIGS. 10F-10K show schematics of examples of securing battery tabs to self-standing electrodes, according to some aspects of the present disclosure.

FIGS. 10H and 10I further illustrate concepts shown in FIG. 3C. FIG. 10J shows a cross-sectional view of the schematic shown in FIG. 10H. FIG. 10K shows a cross-sectional view of the schematic shown in FIG. 10I. FIG. 10L further illustrates concepts shown in FIG. 4A-4D. FIG. 10M further illustrates concepts shown in FIG. 3F. FIG. 10N shows a cross-sectional view along line 409 of the schematic shown in FIG. 10L. FIG. 10O shows a cross-sectional view along line 309 of the schematic shown in FIG. 10M.

FIGS. 11A-D show schematics of a cross section of the tab and the electrode attachment according to various aspects of the present disclosure.

DETAILED DESCRIPTION

Figure 1B:
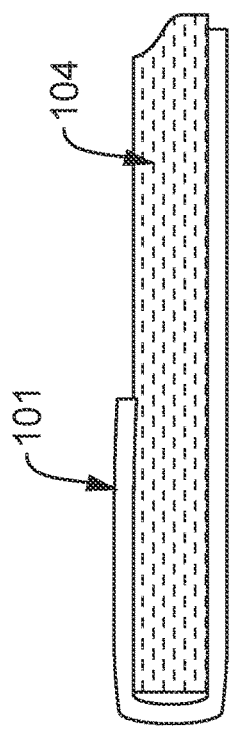
FIG. 1B shows a close-up view of the battery tab-secured electrode of FIG. 1A according to some aspects of the present disclosure, illustrating the first step of the tab attaching process: the tab is folded over the self-standing electrode.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present disclosure provides self-standing electrodes comprising a composite of carbon nanotubes and electrode active materials, with a battery tab secured to the outside, and methods of making the same.

In some embodiments, the present disclosure is directed to a self-standing electrode comprising: a body comprising a composite material having an electrode active material in a three-dimensional cross-linked network of carbon nanotubes; a member extending outward from the body, the member comprising the composite material; and a battery tab secured to the member.

As used herein, "electrode active material" refers to the material hosting Lithium in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

As used herein, the term "about" is defined as being close to as understood by one of ordinary skill in the art. In one non-limiting embodiment, the term "about" is defined to be within 10%, preferably within 5%, more preferably within 1° A, and most preferably within 0.5%.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti, and any mixture thereof. The metal oxide may be lithiated. In an illustrative example, the metal oxide is lithium nickel manganese cobalt oxide ($LiNiMnCoO_2$). The metal oxide powders can have a particle size defined within a range between about 1 nanometer and about 1000 microns, or any integer or subrange in between. In a non-limiting example, the metal oxide particles have an average particle size of about 1 μm to about 10 μm. In a non-limiting example, the metal oxide particles have an average particle size of about 1 nm to about 10 nm. Metals in lithium metal oxides according to the present disclosure may include but are not limited to one or more alkali metals, alkaline earth metals, transition metals, aluminum, or post-transition metals, and hydrates thereof.

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, *neptunium*, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

As used herein, suitable composites or mixtures of "an electrode active material and carbon nanotubes" include, but are not limited to, self-standing electrodes such as those disclosed in U.S. patent application Ser. No. 15/665,171, entitled "Self Standing Electrodes and Methods for Making Thereof," filed Jul. 31, 2017, which is hereby incorporated by reference herein in its entirety. In some aspects, the electrode active material is selected from graphite, hard carbon, silicon, silicon oxides, lithium metal oxides, lithium iron phosphate, sulfur, and lithium metal particles. In some aspects, the electrode active material is selected from graphite, hard carbon, silicon, silicon oxides, lithium metal oxides, lithium metal, and lithium iron phosphate.

In some aspects, the battery tab comprises a metal (including metal alloys). Metals in battery tabs according to the present disclosure may include, but are not limited to, alkali metals, alkaline earth metals, transition metals, aluminum, and post-transition metals, and alloys comprising the same.

In some aspects, the metal may be copper, aluminum, nickel, gold, silver, palladium, platinum, or alloys thereof. In some aspects, the metal may be copper or aluminum. The battery tab may be in any solid physical form, including but not limited to, foil, strips, wire, rod, grid, or mesh. In some aspects, the battery tab has a thickness of about 5 μm to about 2000 μm, or any integer or subrange in between. In some aspects, the battery tab has a thickness of about 100 μm. In some aspects, the battery tab has a thickness of about 15 μm. In some aspects, the battery tab has a width of about 0.001 cm to about 100 cm, or any subrange in between. In some aspects, the battery tab has a width of about 0.5 cm. Tab width and thickness depend on the electrode size and the weight of the active material in it, and, therefore, the current the tab needs to carry. Based on the conductance of tab material, and the current it needs to carry, the minimal tab geometry (especially its cross-section area) can be calculated. The same considerations apply to the size of the protruding "member", and, for large electrodes, direct attachment of the tab to the main body of the electrode (especially along one of the edges, such as shown in FIGS. 2D and 10K) can be preferred. In some cases, mechanical strength considerations can also play a role in selecting the tab geometry and the "member" geometry. The tab length is suitably chosen to reach where the tab needs to reach. As non-limiting examples, the tabs may be commercially available, and the tabs may suitably be 5 mm wide and 100 μm thick. Other common and suitable commercially available sizes include 3, 4 and 8 mm wide, 100 μm thick. In some aspects, the battery tab structure has a width that is about 0.01% to about 100% of the overall width of the electrode, or any integer or subrange in between.

In some aspects, the member has at least a first face and a second face, each of the first face and the second face having a surface area of at least 5 mm×5 mm. The member or protrusion can be wider, narrower or the same width as the tab.

Figure 1A:
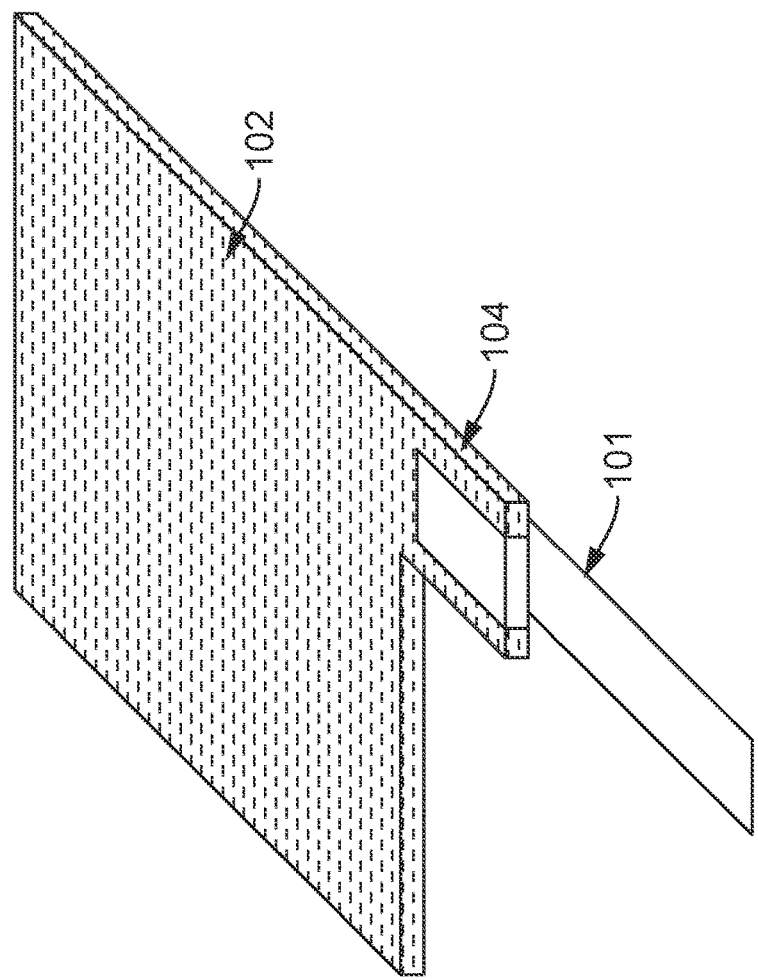
FIG. 1A shows a schematic of a battery tab attached to a protruding member of a self-standing electrode according to some aspects of the present disclosure.

For example, in FIG. 1A, self-standing electrode body 102 has member 104 protruding therefrom, which is wider than tab 101.

Figure 3B:
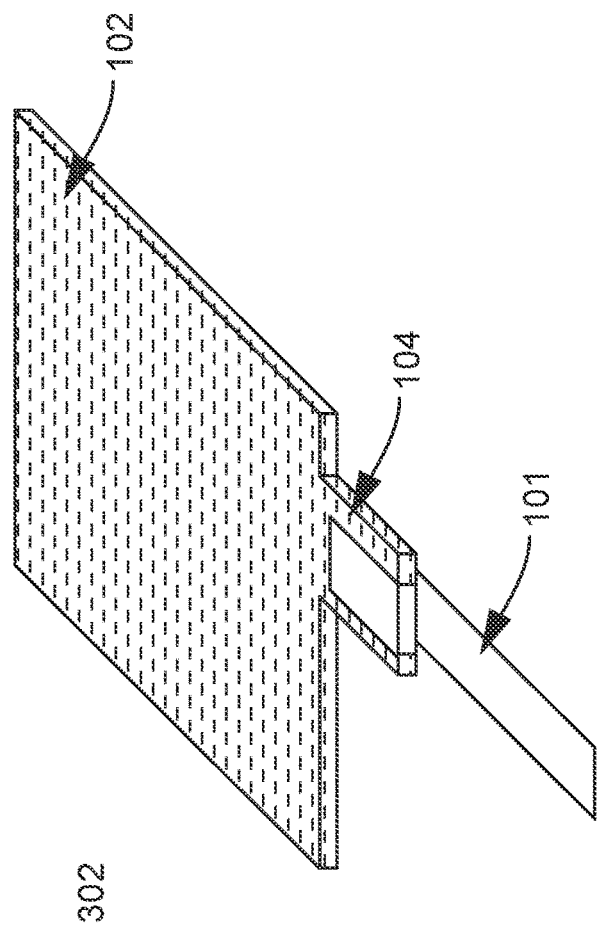
FIGS. 3A-3G show various alternate versions of tab attachment to self-standing electrodes according to some aspects of the present disclosure.
Figure 3A:
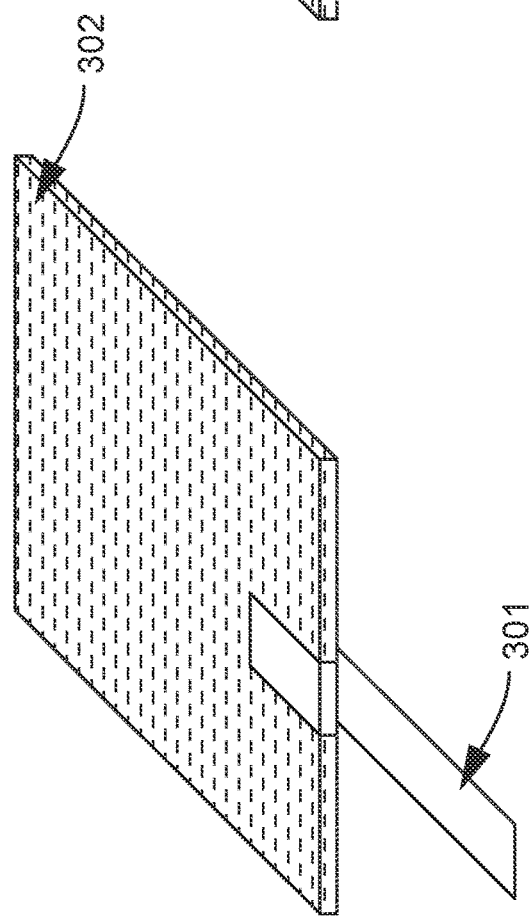
Figure 3E:
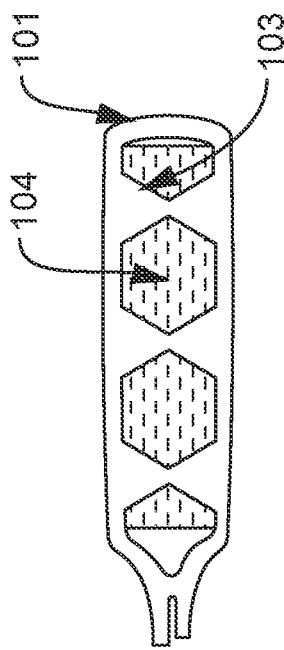
Figure 3C:
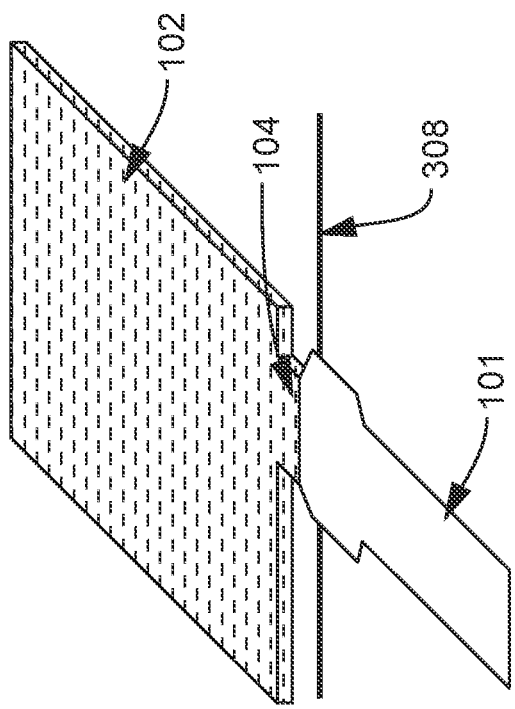

As another non-limiting example, FIG. 3C shows a member 104 protruding from self-standing electrode body 102 where member 104 is narrower than tab 101.

In some aspects, the self-standing electrode body does not have a member or protrusion, and the tab can be attached to the main body of the electrode directly. For example, FIGS. 3A and 3F show attachment of a battery tab 301 or 307 (respectively) directly to self-standing electrode body 302 or 310 (respectively). As another non-limiting example, FIGS. 10A-10G show attachment of one or more battery tabs to a self-standing electrode body, as will be discussed in further detail below.

The tab can fully or partially envelop the protruding member (see, e.g., FIGS. 1A-1E, 2C, 3C), or not envelop it. As a non-limiting example, FIG. 1A shows a schematic of a member 104 protruding from the self-standing electrode 102, and tab 101 partially envelops the protruding member 104. In some aspects, the second face is opposite the first face. In some aspects, the second face is not opposite the first face. In some aspects, the battery tab secured to the member comprises a single sheet of metal that is in contact with the first face and the second face of the member.

In some aspects, a first portion of the single sheet of metal that is in contact with the first face of the member is connected to a second portion of the single sheet of metal that is in contact with the second face of the member via one or more welds, rivets, staples, clamps, or clips. In some aspects, the one or more welds or rivets may go through the member, from the first face to the second face. The number of welds or rivets is not limited in any way. In other aspects, welds or rivets may not be used. FIGS. 1A-1E, 2A-2D, and 3B-3C show examples of battery tab attachment to protruding members of self-standing electrodes with spot welding, rivets, staples, or clamps, as will be discussed in further detail below.

In some aspects, the battery tab has a thickness of about 5 to about 200 μm, or any integer or subrange in between, and a width of less than about 1 cm, or any integer or subrange in between. The battery tab thickness and width suitably depend on the electrode size and shape, weight of the active material, type of the active material, and conductivity of the material the electrode is made of, and other parameters of the battery, and, thus, the current it generates/consumes, as will be known to those of ordinary skill in the art. Other battery parameters affecting the current include, but are not limited to, particle size and shape of the active material; electrolyte composition and concentration (i.e., which solvent(s) are used and in which proportions, which salt(s) are used and in which concentrations); whether it is liquid, gel or solid electrolyte (and the type of the solid electrolyte); the separator membrane (if it is present) composition and geometry, electrodes arrangement in the battery, and many other design and manufacturing parameters, as well as the quality of all components involved. In some aspects, the battery tab thickness is about 10 to about 150 μm, and the battery tab width is about 0.5 cm. In some aspects, the battery tab is suitably long enough to extend past the battery enclosure (which may be, e.g., a pouch) from the site of the tab attachment to the electrode, i.e., one end of the tab is attached to the electrode inside the battery; the other end is outside of the battery; so that the external load can be electrically connected to it. In some cases, such as in batteries with multiple or complex electrodes, the tab is suitably long enough to reach either another electrode or an attachment point to another tab, or to be attached to the battery housing (e.g., in cylindrical or prismatic batteries). The typical length of the commercially available tabs suitable for use with the electrodes and methods of the present disclosure is about 10 cm or less.

The electrode may be of any thickness, such as from about 1 μm to about 10 mm, or any integer or subrange in between. In some aspects, the electrode has a thickness of about 10 μm to about 300 μm. In some aspects, the electrode has a thickness of about 20 μm to about 300 μm. In some aspects, the electrode has a thickness of about 20 μm to about 100 μm. Suitable electrode thickness may depend on the application for the electrode, as will be known to those of ordinary skill in the art. In a non-limiting example, suitable electrode thickness for a car battery may be about 300 μm. In a non-limiting example, suitable electrode thickness for sensors may be from about 10 μm to about 20 μm. In addition, without wishing to be bound by any particular theory, the energy density and/or charge density of the electrode may depend on electrode thickness.

In some aspects, the battery tab secured to the member comprises two sheets of a metal that are in contact with the first face and the second face of the member, and that are connected to each other via one or more welds, rivets, staples, clamps, or clips. In some aspects, the two sheets are connected to each other via one weld or rivet. In some aspects, the two sheets are connected to each other via two or more welds or rivets. It is within the level of ordinary skill in the art to vary and/or optimize the number of welds or rivets, for a given electrode and/or application thereof. In some aspects, the one or more welds or rivets travel through the member. In some aspects, the first face of the member is opposite the second face. Tools, materials, and methods for welding and riveting include those known in the art. Rivets and clamps (such as spring compression clamps) are suitably made of the same material as the tab. Materials for the tab are suitably selected based on the particular chemistry of the battery and based on the electrochemical potential of the electrode it is attached to. In lithium batteries, the cathode tab is typically aluminum, while anode tab is typically copper or nickel; but for other chemistry of the battery other metals can be used. For example, the rivets, staples, or clips can be made of very electrochemically inert metals (e.g., noble metals like gold or platinum). In another non-limiting example, certain grades of stainless steel can also be used, depending on the particular chemistry of the battery (i.e., which active materials and which electrolyte are used). Welds may be formed using any suitable method known in the art, including but not limited to spot welding or ultrasonic welding. Staples, rivets, and clamps may be installed using any suitable method known in the art.

In other embodiments, the present disclosure is directed to a method of making a self-standing electrode, the method comprising: aerosolizing or fluidizing an electrode active material to produce an aerosolized or fluidized electrode active material; and co-depositing the aerosolized or fluidized electrode active material and carbon nanotubes, to form a self-standing electrode; and securing a battery tab to the electrode such that each of at least a first face and a second face of the electrode is in contact with the battery tab. All aspects described with respect to the electrode apply to the method with equal force. In some aspects, this co-depositing may be onto a porous surface. In some aspects, the method further comprises the step of, before securing the battery tab to the electrode, shaping the self-standing electrode to form a body and a member extending outward from the body, and the battery tab is secured to the member.

In some aspects, the battery tab comprises a metal. In some aspects, the metal is aluminum or copper. The metal may be in any solid physical form, including but not limited to one or more wires, grids, meshes, foils, rods, or sheets.

Figure 1C:
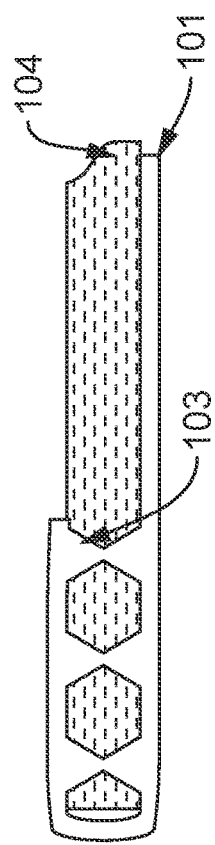
FIG. 1C shows a close-up view of the battery tab-secured electrode of FIG. 1A according to other aspects of the present disclosure, illustrating the second step of the tab attaching process: welds are made (or rivets or staples are inserted and secured) all the way through the tab and the self-standing electrode.
Figure 1D:
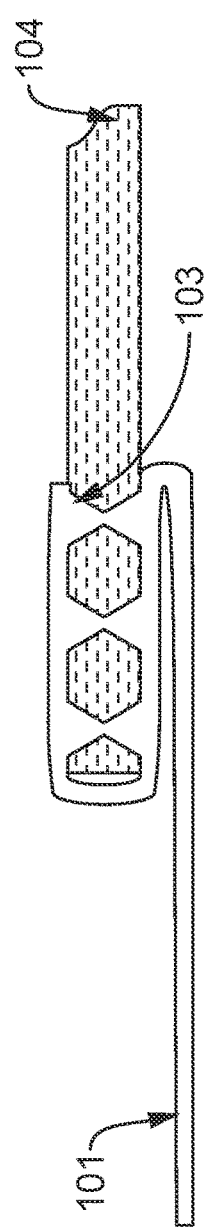
FIG. 1D shows a close-up view of the battery tab-secured electrode of FIG. 1A according to other aspects of the present disclosure, illustrating the third step of the tab attaching process: the tab is properly bent.
Figure 1E:
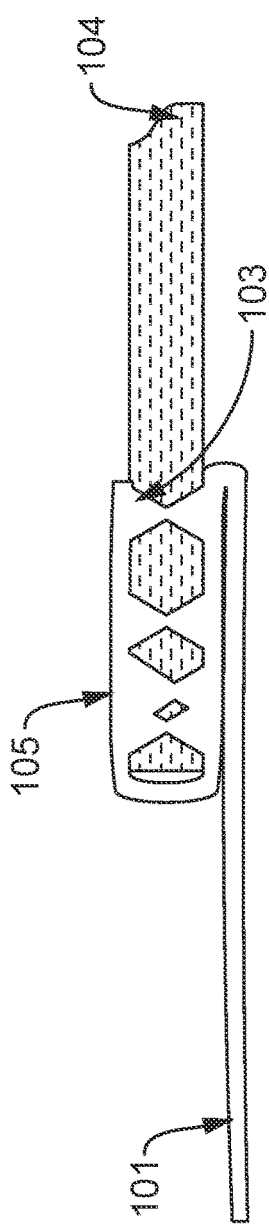
FIG. 1E shows a close-up view of the battery tab-secured electrode of FIG. 1A according to other aspects of the present disclosure, illustrating the fourth (optional) step of the tab attaching process: if desired, the bent tab is secured by additional welds (or rivets).

In some aspects, the securing comprises folding a single sheet of metal over the electrode or member protruding therefrom (FIG. 1B), such that the single sheet is in contact with at least the first face and the second face of the electrode or member protruding therefrom. In FIG. 1B, the tab 101 is folded over member 104. In some aspects, the second face is opposite the first face. The single sheet may be folded by any suitable means to establish contact with the at least first face and second face of the electrode. In some aspects, the securing further comprises connecting the portions of the single sheet that are in contact with the at least two faces of the electrode with each other via one or more welds (FIGS. 1C-1E) or rivets (FIG. 2A) through the electrode. In one non-limiting example, as shown in FIG. 1C, the one or more spot welds 103 run through member 104 to secure tab 101 thereto. In another non-limiting example, as shown in FIG. 1D, the excess length of tab 101 (i.e., after the welds) is folded back out of contact with member 104. In another non-limiting example, as shown in In FIG. 1E, an additional weld 105 is added to secure the excess length of tab 101 to the portion of member 104 with spot welds 103 running through itself. In another non-limiting example, FIG. 2A shows member 104 with tab 101 secured thereto by folding in combination with one or more fasteners 206, which may be staples or rivets.

In some aspects, the one or more welds or rivets travel through the electrode. In some aspects, the at least two faces are at least two opposite faces. In some aspects, the securing comprises contacting each of two faces of the electrode with a respective metal sheet; and connecting the respective metal sheets to one another via one or more welds, rivets, staples, clamps, or clips.

Without wishing to be bound by any particular theory, it is believed that welding or riveting does not impose a limitation on electrode thickness. For example, welding or riveting may be used on electrodes with thickness ranging from about 1 µm to about 5000 µm, or any integer or subrange in between. Preferably, welding or riveting is used on electrodes with thickness ranging from about 10 µm to about 300 µm. In some aspects, folding may be used on electrodes with thickness ranging from about 10 µm to about 5000 µm, or any integer or subrange in between. Preferably, folding is used with electrodes with thickness ranging from about 100 µm to about 300 µm.

The particular mode of welding or fastening used may depend on the thickness of the electrode, as well as on the tab material and thickness, and can be determined by those of ordinary skill in the art. In a non-limiting example, for very thick electrodes (i.e., 200-5000 µm), it may be preferable to use clamps (FIG. 2B-D) or rivets/staples (FIG. 2A), or "wrap around welding configuration" with or without welds through the electrode (FIGS. 10H and 10I). In another non-limiting example, a combination of the welds, rivets, staples and clamps/clips may be used: e.g., folding the tab over the "member protrusion" of a thick electrode as shown at FIG. 10H or 10I, welding the tab foil around the "member", and then placing a clamp over the "member"; or driving rivets/staples through both layers of the tab foil and the body of the member.

Figure 2C:
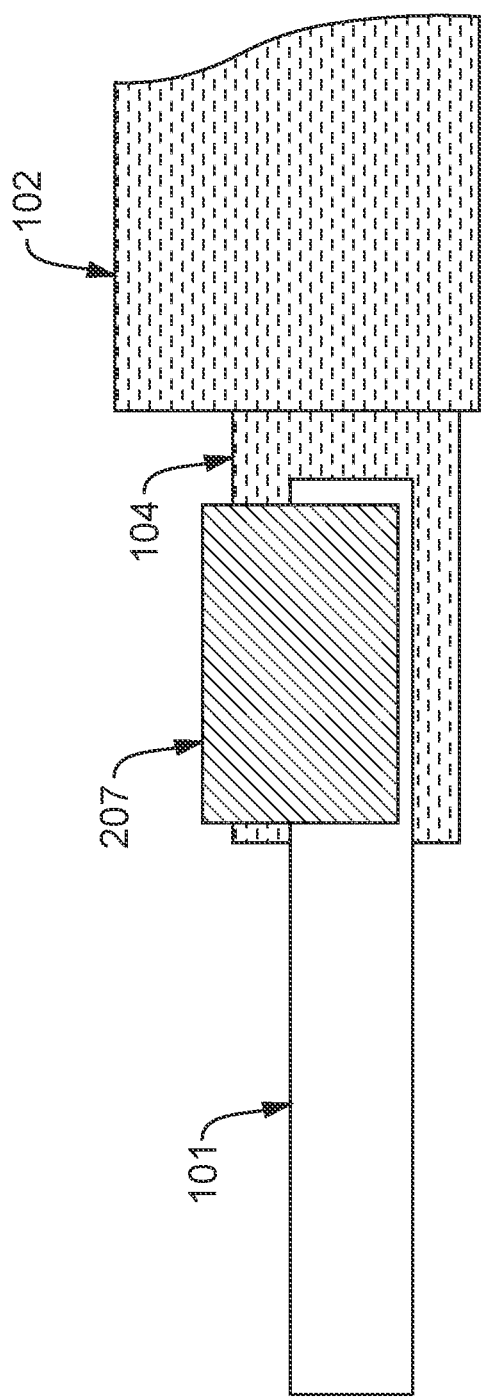
FIG. 2C shows a top down view of the side view shown in FIG. 2B.
Figure 2D:
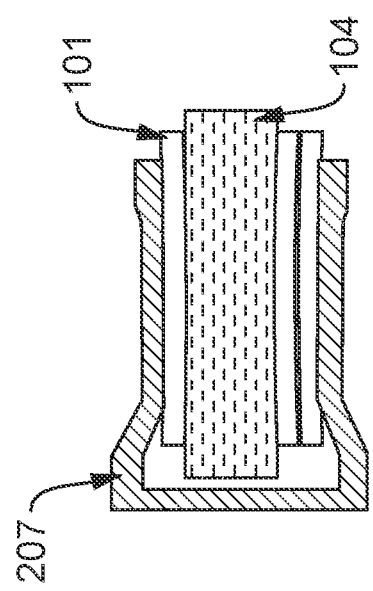
FIG. 2D shows a front view of the electrode shown in FIGS. 2B and 2C.

In one non-limiting example, FIG. 2B shows member 104 with tab 101 secured thereto using clamp 207. In another non-limiting example, FIG. 2C shows a top-down view of the example shown in FIG. 2B, with member 104 protruding from self-standing electrode body 102. As shown in FIG. 2C, member 104 is wider than tab 101. FIG. 2D shows a front view of the view shown in FIG. 2C.

Without wishing to be bound by any particular theory, it is believed that welding or riveting may lower the contact resistance of the battery tab-secured self-standing electrode; i.e., welding or riveting may increase the degree of contact between the electrode and the battery tab at the interface. As will be known to those of ordinary skill in the art, the lower the degree of contact, the higher the contact resistance, and the greater the degree of energy loss. It may be preferable to minimize the degree of energy loss, for example, by increasing the degree of contact between the electrode and the battery tab at the interface. With thicker electrodes, it may be desirable to lower the contact resistance in the battery tab-secured self-standing electrodes by welding, riveting, or other suitable means as will be known in the art.

In some aspects, the method further comprises the step of, before securing the battery tab to the electrode, shaping the self-standing electrode to form a body and a member extending outward from the body, and wherein the battery tab is secured to the member. Aspects of battery tab attachment to the electrode body apply to battery tab attachment to the electrode member with equal force, and vice versa.

The battery tab may be sized such that the width of the battery tab does not exceed the width of the electrode body or member. In some aspects, the width of the battery tab is less than the width of the electrode body or member, by less than about 50 mm, such as by less than about 40 mm, less than about 30 mm, less than about 20 mm, or less than about 10 mm, or any integer or subrange in between. The difference in width between the battery tab and the electrode body or member may depend on the electrode active materials and/or the metal used in the battery tab, and/or on the application of the battery tab-secured electrode. In some aspects, the shaping of the self-standing electrode to form the body and the member extending outward from the body comprises cutting the self-standing electrode so as to leave a member extending outward from the body. Alternatively, the electrode might be deposited (from the aerosolized mixture of components) onto a porous surface shaped as the final shape of the electrode (with all desired protrusions, etc.), and no further shaping/cutting is necessary.

Figure 3D:
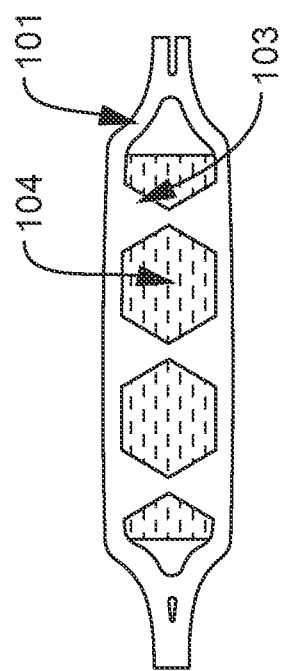
Figure 3G:
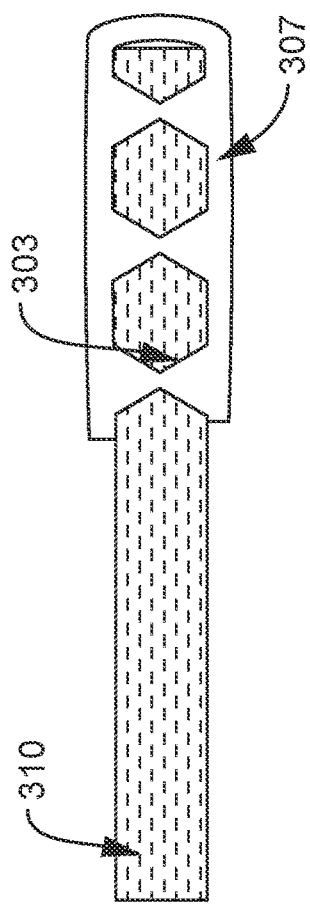
Figure 3F:
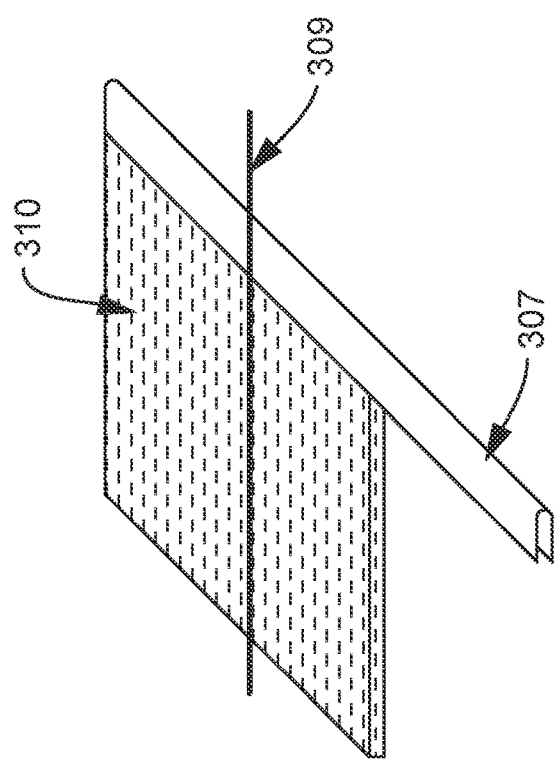

FIGS. 3A-3G show exemplary geometries of attachment of the battery tab to the electrode. In FIG. 3A, the tab 301 is attached perpendicular or at an angle to the self-standing electrode body 302. Tab 301 may be similar in some aspects to tab 101. Self-standing electrode body 302 may be similar in some aspects to self-standing electrode body 102. In FIG. 3B, the tab 101 is attached to a member 104 (typically wider than the tab or of a similar width) protruding from self-standing electrode body 102 without encapsulating the member 104. In FIG. 3C, the tab 101 is attached to a member 104 protruding from body 102, where member 104 is narrower than the tab 101. The member 104 may be fully or partially encapsulated by tab 101. FIGS. 3D and 3E show cross-sectional views along line 308 in FIG. 3C. Tab 101 may wrap around member 104 in one (FIG. 3E) or two (FIG. 3D) pieces, with spot welds 103 through member 104. In FIG. 3F, the folded tab 307 envelops the edge of the self-standing electrode body 310 (or an edge of a protrusion). FIG. 3G shows a cross-sectional view along line 309 in FIG. 3F, showing spot welds 303 connecting folded tab 307 to itself through self-standing electrode body 310. Self-standing electrode body 310 may be similar in some aspects to self-standing electrode body 102. Tab 307 may be similar in some aspects to tab 101.

In some aspects, the battery tab attachment may be a multi-layer battery tab attachment, such as shown in FIGS. 4A-4D. A multi-layer battery tab attachment suitably uses the tab as described above in addition to one or more additional sheets of metal foil, which are suitably thin foils, such as carbon-coated metal foils. FIG. 4A shows enveloping (partially or fully) self-standing electrode material 422 with a thin (5-25 μm) metal foil 425, which is suitably the same metal as the tab 401 (i.e., aluminum for cathode and copper for anode), and doing so prior to tab attachment and/or welding reduces electrode material damage during handling and welding. The tab foil 401 is suitably placed over the thin foil 425 (FIG. 4B), and the welding is done through all layers (FIG. 4C), i.e., one or more spot welds 403 connect tab 401 through thin metal foil 425, through self-standing electrode body 422, through second leg of thin metal foil 425, to second leg of tab 401. If the thin metal foil 425 is carbon-coated, it can also improve adhesion of the electrode material 422 and the tab 401 and therefore improve electrical contact between the tab 401 and the electrode 422. Excess thin foil 425 can be removed after tab 401 welding and bending (FIG. 4D), if desired, using any suitable means known in the art.

In some aspects, the co-depositing the aerosolized active material and carbon nanotubes comprises contacting the aerosolized electrode active material powder with the carbon nanotubes in a carrier gas to form a mixture of the carbon nanotubes and the aerosolized electrode active material powder; collecting the mixture on the porous surface; and removing the carrier gas. Suitable methods and apparatuses for contacting the aerosolized electrode active material powder with the carbon nanotubes in a carrier gas to form a mixture of the carbon nanotubes and the aerosolized electrode active material powder, suitable porous surfaces, and suitable methods and apparatuses for removing carrier gases are known to those of ordinary skill in the art and include, but are not limited to, those disclosed in U.S. patent application Ser. No. 15/665,171, entitled "Self Standing Electrodes and Methods for Making Thereof," filed Jul. 31, 2017, which is hereby incorporated herein by reference in its entirety. Carbon nanotubes suitable for use in the methods of the present disclosure include single-walled nanotubes, few-walled nanotubes, and multi-walled nanotubes. In some aspects, the carbon nanotubes are single-walled nanotubes. Few-walled nanotubes and multi-walled nanotubes may be synthesized, characterized, co-deposited, and collected using any suitable methods and apparatuses known to those of ordinary skill in the art, including those used for single-walled nanotubes.

In some aspects, the co-depositing comprises co-depositing the aerosolized or fluidized electrode active material and carbon nanotubes onto a porous surface to form a binderless self-standing electrode.

Figure 5:
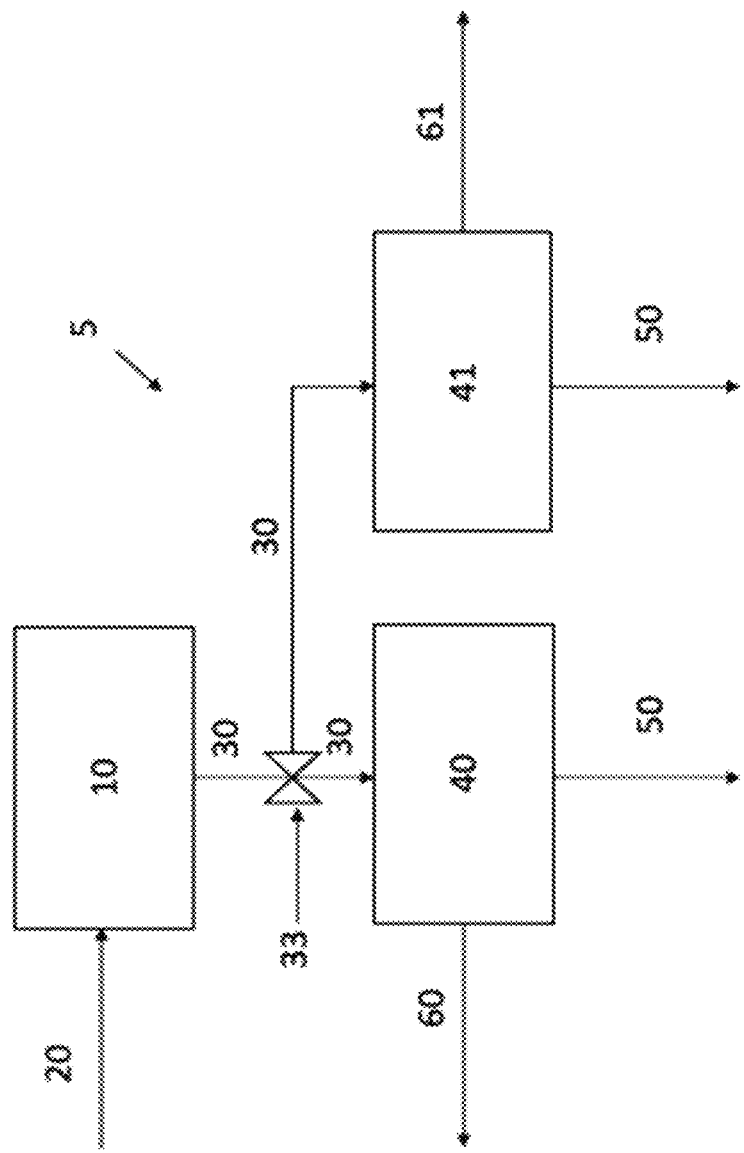
FIGS. 5 and 6 are flow diagrams illustrating exemplary apparatuses for making a self-standing electrode according to some aspects of the present disclosure.

The apparatus for providing the aerosolized mixture of carbon nanotubes and electrode active materials is not limited in any way. In an illustrative example as shown in FIG. 5, an apparatus 5 for the production of self-standing electrodes is provided. The carbon nanotubes and the electrode active materials are added to a vessel 10. The carbon nanotubes and the electrode active materials may be individually collected from their respective manufacturing processes and directly or indirectly introduced from such processes into the vessel 10 at a desired ratio for the self-standing electrode. One or more carrier gases 20 may then be introduced to the vessel 10 to aerosolize the mixture of the nanotubes and electrode active materials. The resulting mixed aerosolized stream 30 comprising the nanotubes and the electrode active materials entrained in the carrier gas is directed to a porous substrate 40, such as a filter. The carrier gas passes through the porous substrate 40 as gas stream 50 while the mixture of the nanotubes and the electrode active material is captured on the surface of the porous substrate 40 to form the self-standing electrode 60. The self-standing electrode 60 can be removed from the porous substrate 40 when it reaches the desired thickness.

Optionally, the apparatus 5 may include a plurality of porous substrates 40, 41 to allow for the continuous production of self-standing electrodes 60, 61. Although only two porous substrates are shown, it is to be understood than any number of porous substrates may be included in the apparatus 5. In a non-limiting example, when the flow of the mixed aerosolized stream 30 across the porous substrate 40 produces the self-standing electrode 60 of the desired thickness, a valve 33 may be adjusted to transfer the flow of the mixed aerosolized stream 30 to a second porous substrate 41. The self-standing electrode 60 may be removed from the first porous substrate 40 during formation of the self-standing electrode 61 on the porous substrate 41. When the flow of the mixed aerosolized stream 30 across the second porous substrate 41 produces the self-standing electrode 61 of a desired thickness, the valve 33 may be adjusted to transfer the flow of the mixed aerosolized stream 30 back to the first porous substrate 40. The thickness and/or cross-sectional area of the self-standing electrode 61 may be the same, or different, than the cross-sectional area of the self-standing electrode 60. For example, the self-standing electrode 61 may have a greater thickness and/or cross-sectional area than the self-standing electrode 60.

It is to be understood that a variety of different methods may be used for automatically switching the valve 33 to redirect the flow of the mixed aerosolized stream 30 from one porous substrate to the other. Illustrative examples of systems that may be used to adjust the valve 33 to redirect the flow of the mixed aerosolized stream 30 include one or more sensors for detecting the thickness of the self-standing electrodes 60 and 61, one or more pressure sensors for monitoring a pressure drop across the porous substrates 40 and 41 that corresponds to a desired thickness of the self-standing electrodes 60 and 61, a timer that switches the valve 33 after a set time corresponding to a desired thickness of the self-standing electrodes 60 and 61 for a given flow rate of the mixed aerosolized stream 30, and any combination thereof; after the one or more pressure sensors measures a pressure drop associated with the desired thickness of the self-standing electrode 60 or 61 on porous substrate 40 or 41, or after the one or more thickness sensors detect the desired thickness of the self-standing electrode 60 or 61 on porous substrate 40 or 41, or after the timer measures the set time corresponding to the desired thickness of self-standing electrode 60 or 61 on porous substrate 40 or 41, the mixture is redirected from one porous substrate to the other. It is also to be understood that the porous substrates 40 and/or 41 may have a cross-sectional area that matches the desired cross-sectional area required for use in the battery cell to be made with the self-standing electrode 60 and/or 61. Accordingly, the self-standing electrodes 60 and/or 61 would require no further processing of the cross-sectional area, such as cutting, before assembly in the final battery cell. It is to be understood that the configuration of the vessel 10 is not intended to be limited in any way.

Figure 6:
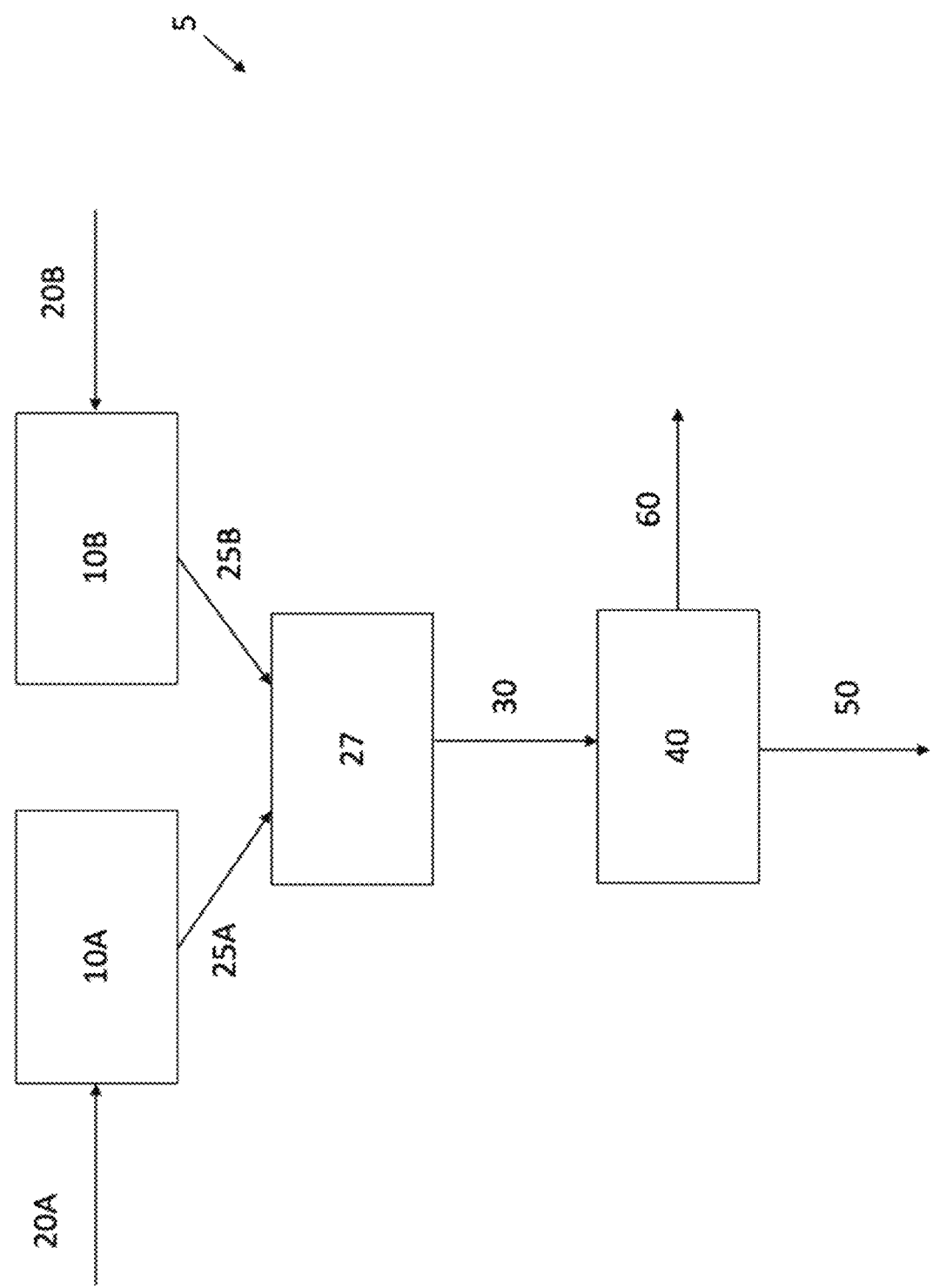

As shown in FIG. 6, the nanotubes and the electrode active material may be individually aerosolized before mixing. For example, the nanotubes may be provided in the vessel 10A and the electrode active material may be provided in the vessel 10B. One or more carrier gases 20A may be introduced to the vessel 10A to aerosolize the nanotubes, and one or more carrier gases 20B may be introduced to the vessel 10B to aerosolize the electrode active materials. An aerosolized stream 25A comprises the nanotubes entrained in the carrier gas 20A introduced to the vessel 10A, and an aerosolized stream 25B comprises the electrode active materials entrained in the carrier gas 20B introduced to the vessel 10B. The aerosolized stream 25A is mixed with the aerosolized stream 25B at junction 27. The junction 27 may have any configuration capable of combining the aerosolized stream 25A and the aerosolized stream 25B into the mixed aerosolized stream 30 that comprises a mixture of the nanotubes and the electrode active materials entrained in the carrier gases. The mixed aerosolized stream 30 is directed to the porous substrate 40. The carrier gas passes through the porous substrate 40 as gas stream 50 while the mixture of the nanotubes and the electrode active material is captured on the surface of the porous substrate 40 to form the self-standing electrode 60. The self-standing electrode 60 can be removed from the porous substrate 40 when it reaches the desired thickness. The carrier gases 20A and 20B may be the same, or different, and may be introduced at the same or different flow rates. For example, the flow rates of the carrier gases 20A and 20B may be tailored to feed the nanotubes and the electrode active material to the junction 27 at the individual flow rates necessary to achieve the desired ratio of nanotubes to electrode active material in the resulting self-standing electrode 60. Although not shown, it is to be understood that more than one porous substrate 40 may be provided as described with respect to FIG. 5.

Figure 7:
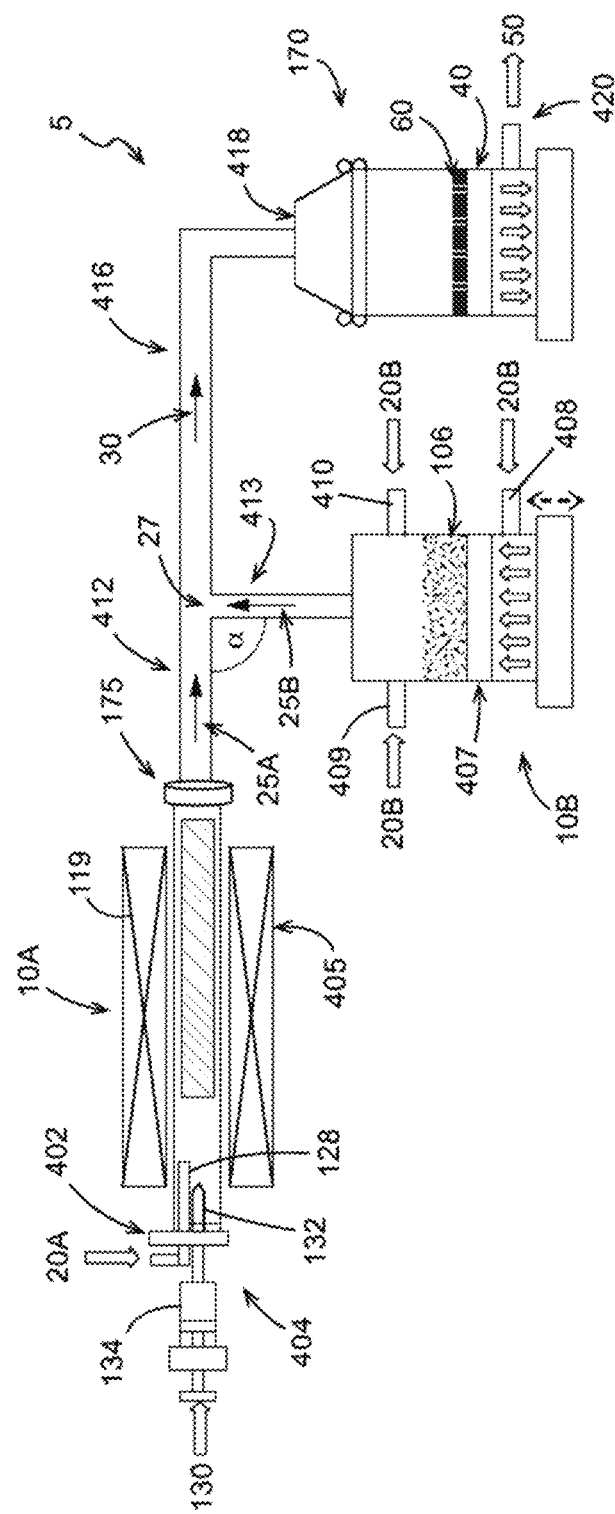
FIG. 7 is a schematic view of an apparatus for making a self-standing electrode according to some aspects of the present disclosure.

As shown in FIG. 7, the nanotubes may be provided in an aerosolized stream 25A directly from the vessel 10A that is configured as a nanotube synthesis reactor for mixing with an aerosolized stream 25B of the electrode active material from the source 106. Accordingly, the aerosolized stream 25A may be a product stream exiting the nanotube synthesis reactor. For example, a carbon source or carbon precursor 130 may be introduced to the vessel 10A in the presence of one or more carrier gases 20A to form carbon nanotubes. The aerosolized stream 25A of carbon nanotubes exits the reactor outlet 175 and travels down a pipe or tube 412 to a junction 27 where the aerosolized carbon nanotubes are mixed with the aerosolized stream 25B of the electrode active materials. Although the pipes forming the junction 27 intersect at a 90 degree angle of intersection cap, other angles of intersection a may be formed. In a non-limiting example, the angle of intersection a may be an acute angle that facilitates flow of the resulting mixed aerosolized stream 30 from the junction 27 to the porous substrate 40. Although not shown, it is to be understood that more than one porous substrate 40 (and collection vessel 170) may be provided as described with respect to FIG. 5.

As an alternative to the specific apparatus noted above where the electrode active material is mixed with the nanotubes after the nanotubes are formed, the electrode active material can be mixed in situ in a fluidized bed reactor or chamber with the nanotubes as the nanotubes are formed.

In some aspects, the co-depositing the aerosolized or fluidized electrode active material and carbon nanotubes comprises simultaneously contacting with the porous surface the aerosolized or fluidized electrode active material and the carbon nanotubes, wherein the aerosolized or fluidized electrode active material and the carbon nanotubes were not previously in contact with one another.

The co-depositing may occur over any duration of time. Without wishing to be bound by any particular theory, the thickness of the binderless, collectorless self-standing electrode may be determined by one or more factors including but not limited to the duration of time of co-depositing, the flow rate of the mixture of the carbon nanotubes and the aerosolized electrode active material powder, and the concentrations of the aerosolized electrode active material and/or the carbon nanotubes. In some aspects, about 20 minutes of co-depositing may result in a binderless, collectorless self-standing electrode with a thickness of about 30 µm. In some aspects, about 2 hours of co-depositing may result in a binderless, collectorless self-standing electrode with a thickness of about 100 µm. Those of ordinary skill in the art will be able to vary those factors to obtain self-standing electrodes of desired thickness and/or other properties, such as electric charge or energy charge. For example, the aforementioned flow rate and/or concentrations may be varied using the methods and apparatuses disclosed in U.S. patent application Ser. No. 15/665,171, entitled "Self Standing Electrodes and Methods for Making Thereof," filed Jul. 31, 2017, which is hereby incorporated by reference herein in its entirety. In some aspects, the overall thickness of the electrode is about 10 µm to about 5000 µm. In some aspects, the overall thickness of the electrode is about 20 µm to about 100 µm.

In some aspects, the securing comprises: contacting each of two faces of the electrode with a respective metal sheet; and connecting the respective metal sheets to one another via one or more welds, rivets, staples, clamps, or clips. In some aspects, the two faces are two opposite faces. In some aspects, the one or more welds, rivets, or staples travels through the electrode.

In addition, the thickness of the binderless, collectorless self-standing electrode may be modified by pressing, which may reduce the overall thickness by as much as 5 times, such as by about 4 times, by about half, by about 1.5 times, or any range in between. For example, a binderless, collectorless self-standing electrode with a thickness of 100 μm may be pressed to a thickness of 50 μm (i.e., reduced overall thickness by half), or a binderless, collectorless self-standing electrode with a thickness of 500 μm may be pressed to a thickness of 100 μm (i.e, reduced overall thickness by 5 times). In some aspects, pressing reduces overall thickness by half. In some aspects, pressing reduces overall thickness by about 1.5 times to by about 3 times. Pressing may also modify the density of the electrode. Suitable methods and apparatuses for pressing electrodes are known in the art are include but are not limited to those disclosed in U.S. patent application Ser. No. 15/665,171, entitled "Self Standing Electrodes and Methods for Making Thereof," filed Jul. 31, 2017, which is hereby incorporated by reference herein in its entirety.

As will be known to those of ordinary skill in the art, pressing or compression may improve electrical and/or mechanical contact between the battery tab and the composite, and it may also make the composite mechanically stronger. However, too much compression or pressing can hinder electrolyte access to the inner parts of the electrode, and complicate the movement of lithium ions in and out of the electrode, thereby worsening battery dynamic characteristics. Alternatively, too thick of an electrode may hold sufficient energy, but be too slow to produce energy or may not be suitably flexible. Alternatively still, it may be desirable to obtain an electrode foil that is flexible without formation of cracks and/or delaminations. On the other hand, if the electrode is too thin, energy production may be rapid but it may be the case that not enough energy is produced. In addition, it may be desirable to regulate the distance between the rolls or rollers in a rolling press or calendaring machine, or between the plates of a platen press. It is within the knowledge of those of ordinary skill in the art to determine optimal pressing thickness based on the properties desired in the electrode.

Figure 8:
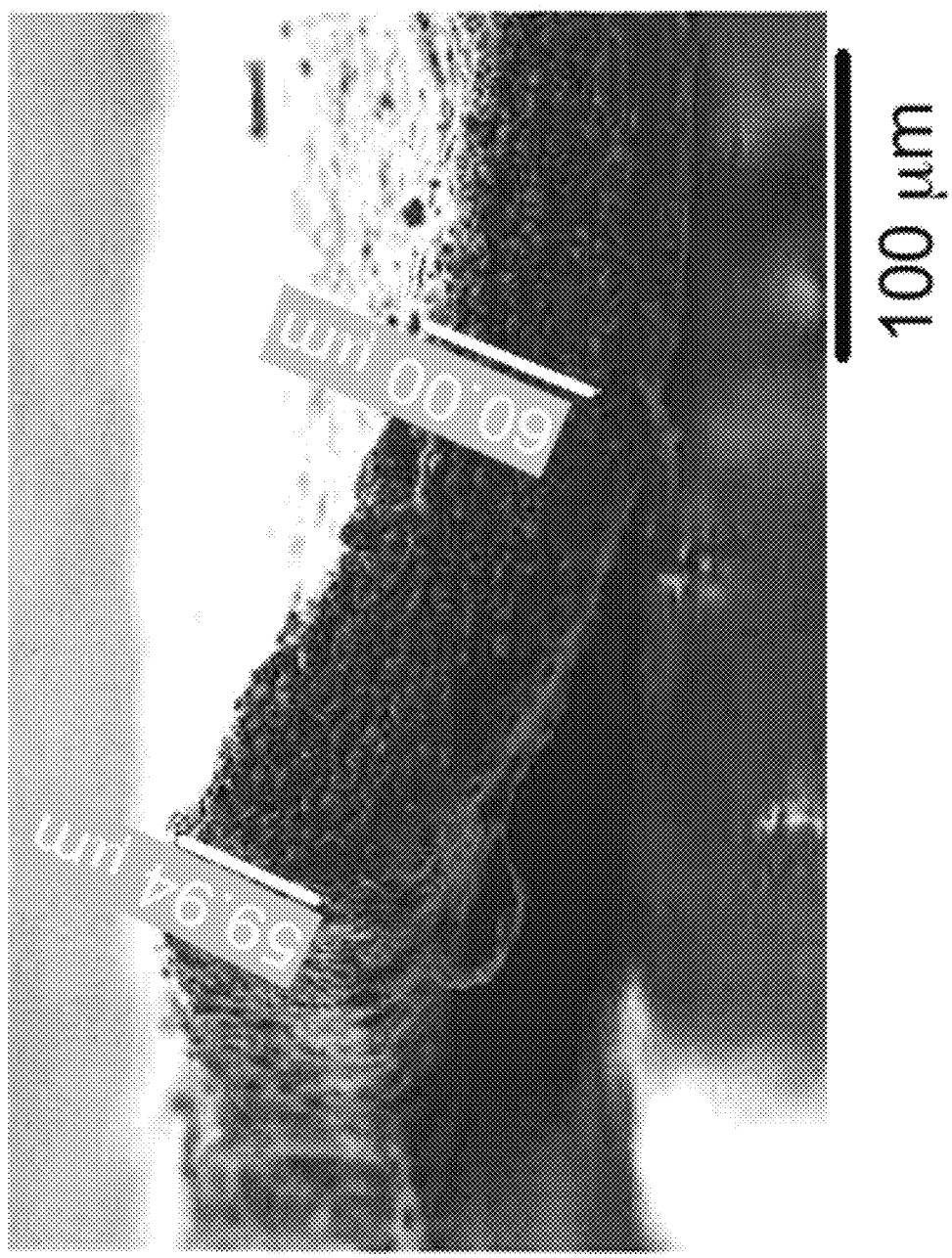
FIG. 8 is a magnified side view of a treated self-standing electrode for use according to the present disclosure.

Binderless, collectorless self-standing electrodes suitable for use in the methods or apparatuses of the present disclosure may be flexible or not flexible. As used herein, an electrode that is "flexible" is able to be bent without cracking or breaking. As will be known to those of ordinary skill in the art, flexibility may depend on one or more chemical and/or material factors, including but not limited to composition and degree of compression. For example, very strongly compressed electrodes may be very rigid and can even become brittle. Similarly, low nanotube content electrodes can also be mechanically weak and may even shed particles of active material. However, in other non-limiting examples, self-standing electrode material may be too flexible if the material wrinkles, folds, or rolls on itself easily, as this might complicate stretching and spreading it over the desired area, e.g., during the battery layers stacking, or during the insertion into an enclosure. Higher nanotube content contributes to flexibility and mechanical strength. FIG. 8 shows a side view of an electrode for use according to the present disclosure. FIG. 8 shows a self-standing electrode 60 with a thickness of 60 μm. The self-standing electrode shown in FIG. 8 (after pressing) is flexible and bent upwardly at the illustrated corner. This is likely due to the web-like or non-woven fiber sheet formed by the carbon nanotubes as shown in the top view shown in FIG. 9 (after pressing). The carbon nanotube web surrounds LiNiMn-CoO$_2$ particles to retain the LiNiMnCoO$_2$ particles therein without the need for binder in a flexible manner that allows for bending of the self-standing electrode.

In some embodiments, the present disclosure is directed to a self-standing electrode comprising: a self-standing body that is free of a binder and comprises a composite material having electrode active material particles in a three-dimensional cross-linked network of carbon nanotubes, the self-standing body includes a first face and a second face opposite the first face; and a battery tab secured to the self-standing body that comprises: a body; a first leg extending from the body of the battery tab; and a second leg extending from the body of the battery tab, wherein the self-standing electrode body is positioned between the first leg and the second leg, and the first leg contacts the first face of the self-standing body, and the second leg contacts the second face of the self-standing body. All aspects described with respect to the aforementioned embodiments apply to the present embodiment with equal force, and vice versa.

The battery tab body refers to the portion of the battery tab not in contact with the self-standing electrode. The first and second legs of the battery tab are the portions of the battery tab in direct contact with first and second face of the self-standing electrode, respectively.

In some aspects, the first leg covers less than 50% of the surface area of the first face of the self-standing body, and the second leg covers less than 50% of the surface area of the second face of the self-standing body.

In some aspects, the first leg covers less than 33% of the surface area of the first face of the self-standing body, and the second leg covers less than 33% of the surface area of the second face of the self-standing body.

In some aspects, the first leg covers less than 25% of the surface area of the first face of the self-standing body, and the second leg covers less than 25% of the surface area of the second face of the self-standing body.

FIGS. 10A-E show exemplary geometries of battery tab attachment to the self-standing electrode body. In FIG. 10A, the battery tab 1001 is attached at a corner of the self-standing electrode body 1002, with the battery tab 1001 partially overlapping with the self-standing electrode body 1002. In FIG. 10B, the battery tab 1001 is attached to an edge of the self-standing electrode body 1002, with an overlap area defined by the width of the battery tab 1001 and one dimension of the self-standing electrode body 1002. Multiple battery tabs 1001 may also be attached to a single self-standing electrode 1002. In FIG. 10C, two tabs 1001 are attached in the same geometry as shown in FIG. 10B, one at each of two opposite edges of the self-standing electrode body 1002, and a third tab 1001 is attached to the self-standing electrode body 1002 at a distance between the first two tabs 1001. The multiple tabs 1001 may have the same or different lengths and/or widths. In FIG. 10D, the battery tab 301 is attached at the same position as the third tab 1001 in FIG. 10C. In addition, the self-standing electrode 302 may be of any shape, such as a circle as shown in FIG. 10E. Tabs 1001 and 1101 may be similar in some aspects to tabs 101 or 307. Self-standing electrode bodies 1002, 1102, and 1202 may be similar in some aspects to self-standing electrode bodies 102 or 310.

Figure 10G:
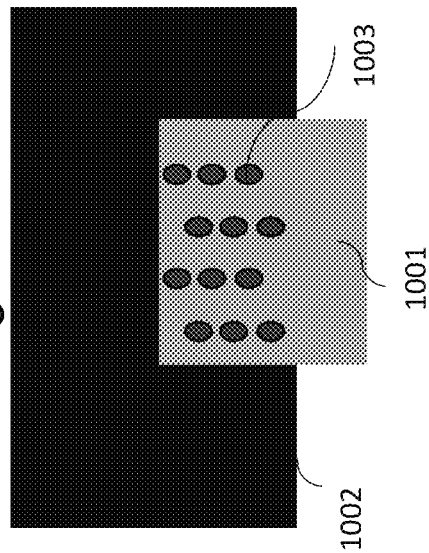
Figure 10F:
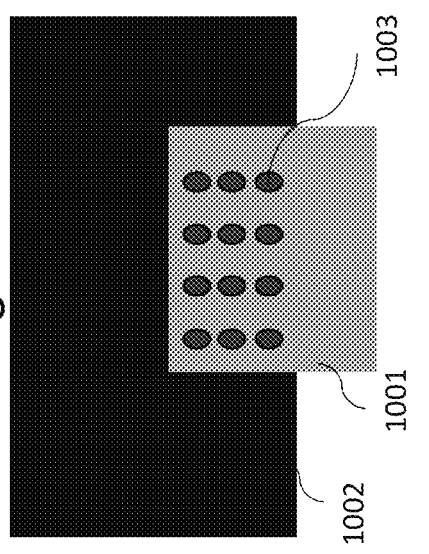

Battery tabs may be secured to the self-standing electrode body by any suitable means, including but not limited to those described for securing of battery tabs to members protruding from self-standing electrode bodies, such as folding, spot welding, or riveting. Spot welding or riveting may be performed using methods and apparatuses known to persons of ordinary skill in the art, and spot welds or rivets may be applied to connect the self-standing electrode body and the battery tab in any number and pattern or array suitable to secure the battery tab to the self-standing electrode body. FIGS. 10F and 10G show non-limiting examples of patterns or arrays for connections 1003 connecting battery tab 1001 to self-standing electrode body 1002, from the first leg of the battery tab, through the self-standing electrode, to the second leg of the battery tab. Connectors 1003 may be similar in some aspects to spot welds 103. Tabs 1001 may be similar in some aspects to tabs 101 or 301. Self-standing electrode body 1002 may be similar in some aspects to self-standing electrode bodies 102 or 302. FIGS. 10H and 10I show non-limiting examples of patterns or arrays for connectors 103 connecting battery tab 101 to member 104 protruding from self-standing electrode body 102, with the cross-sections indicated consistent with FIGS. 3D and 3E, respectively (see FIGS. 10J and 10K, respectively). FIG. 10L shows a non-limiting example of a pattern or array for connectors 403 connecting battery tab 401 and carbon-coated thin foil 425 to self-standing electrode body 422, with the cross-section along line 409 shown in FIG. 4D (see FIG. 10N). FIG. 10M shows a non-limiting example of a pattern or array for connectors 303 connecting battery tab 307 to self-standing electrode body 310 with the cross-section along line 309 shown in FIG. 3G (see FIG. 10O).

In some aspects, the first leg and the second leg each extends outward from the body of the battery tab, at least a first connection extends from the first leg and through the self-standing body to the second leg, and a first portion of the self-standing body is positioned between the body of the battery tab and the first connection. In some aspects, a second connection extends from the first leg and through the self-standing body to the second leg, and a second portion of the self-standing body is positioned between the first connection and the second connection. In some aspects, the first connection and the second connection are spot welds. In other aspects, the first connection and the second connection are rivets. In some aspects, the first connection and the second connection are ultrasonic welds. In some aspects, the tab is attached directly to the self-standing body. In some aspects, the tab is attached perpendicular to the edge of the main body of the electrode. In some aspects, the tab is attached at an angle to the edge. In some aspects, the tab comprises a single sheet of metal folded over the electrode. In some aspects, the tab comprises two sheets, each placed on an opposite face of the electrode. In some aspects, the tab is attached to a protrusion from the body, the protrusion being wider than the tab or of about the same width as the tab. In some aspects, the tab is attached to a protrusion from the body, the protrusion being narrower than the tab. In some aspects, the tab is folded over an edge of the main body of the electrode, or a protrusion therefrom, and the tab is secured by welds, rivets, staples, clamps, or clips. In some aspects, each of the first leg and the second leg comprises two or more layers of metal foil. In some aspects, the battery tab comprises two sheets of metal folded over the electrode.

FIGS. 11A-11D show schematics of a cross-section of the tab and the electrode attachment according to some aspects of the present disclosure. In the aspects shown in FIG. 11A, tab 1111 sandwiches bulk electrode 1114, which contains a bulk nanotube content, such as 0.5-10 wt % of nanotubes.

Figure 11B:
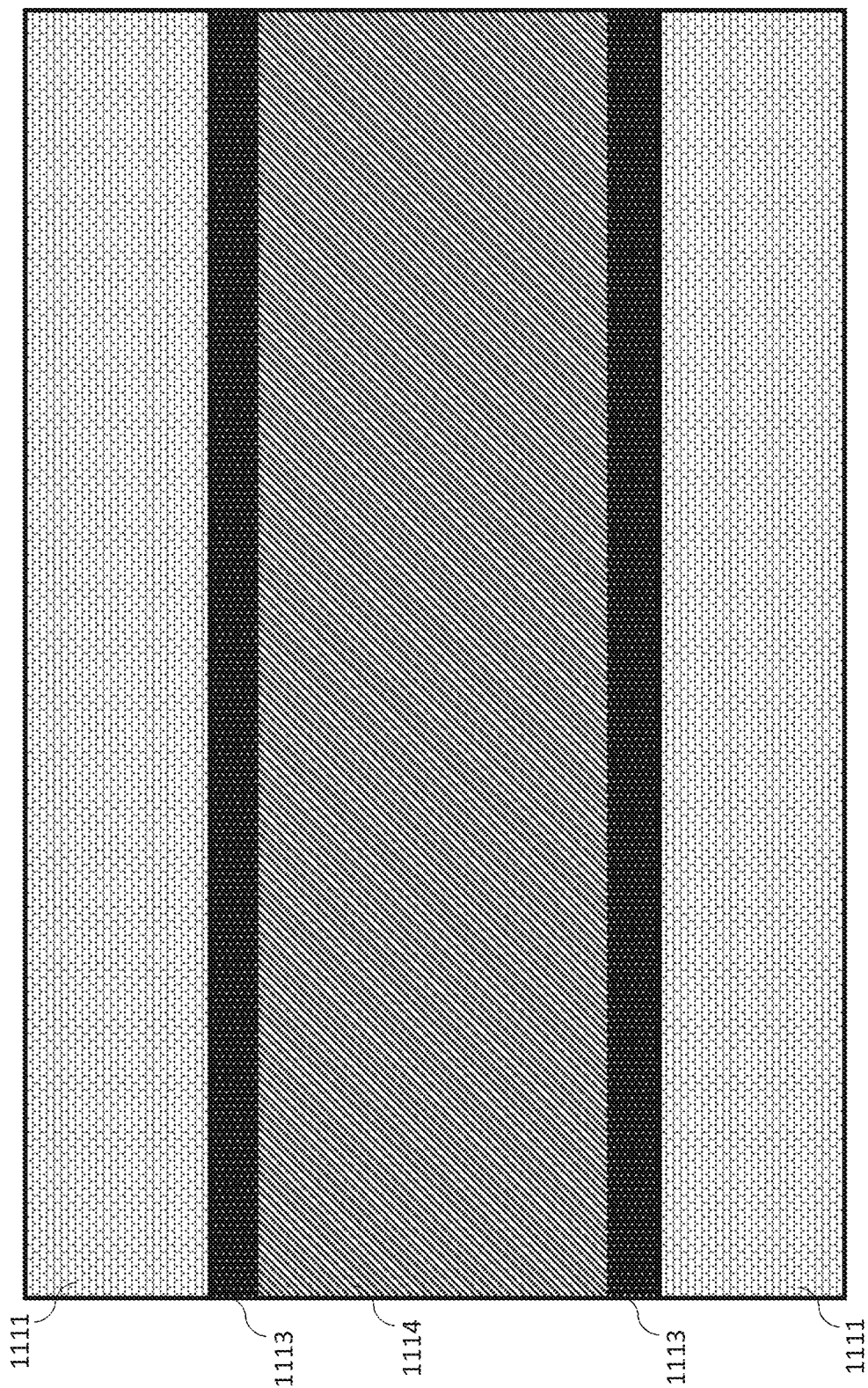

In some preferred aspects, as shown in FIG. 11B, bulk electrode 1114 is sandwiched by region 1113, which contains increased nanotube content electrode material, such as 5-100 wt % of nanotubes. The region 1113-bulk electrode 1114-region 1113 sandwich is then further sandwiched by the tab 1111.

Figure 11C:
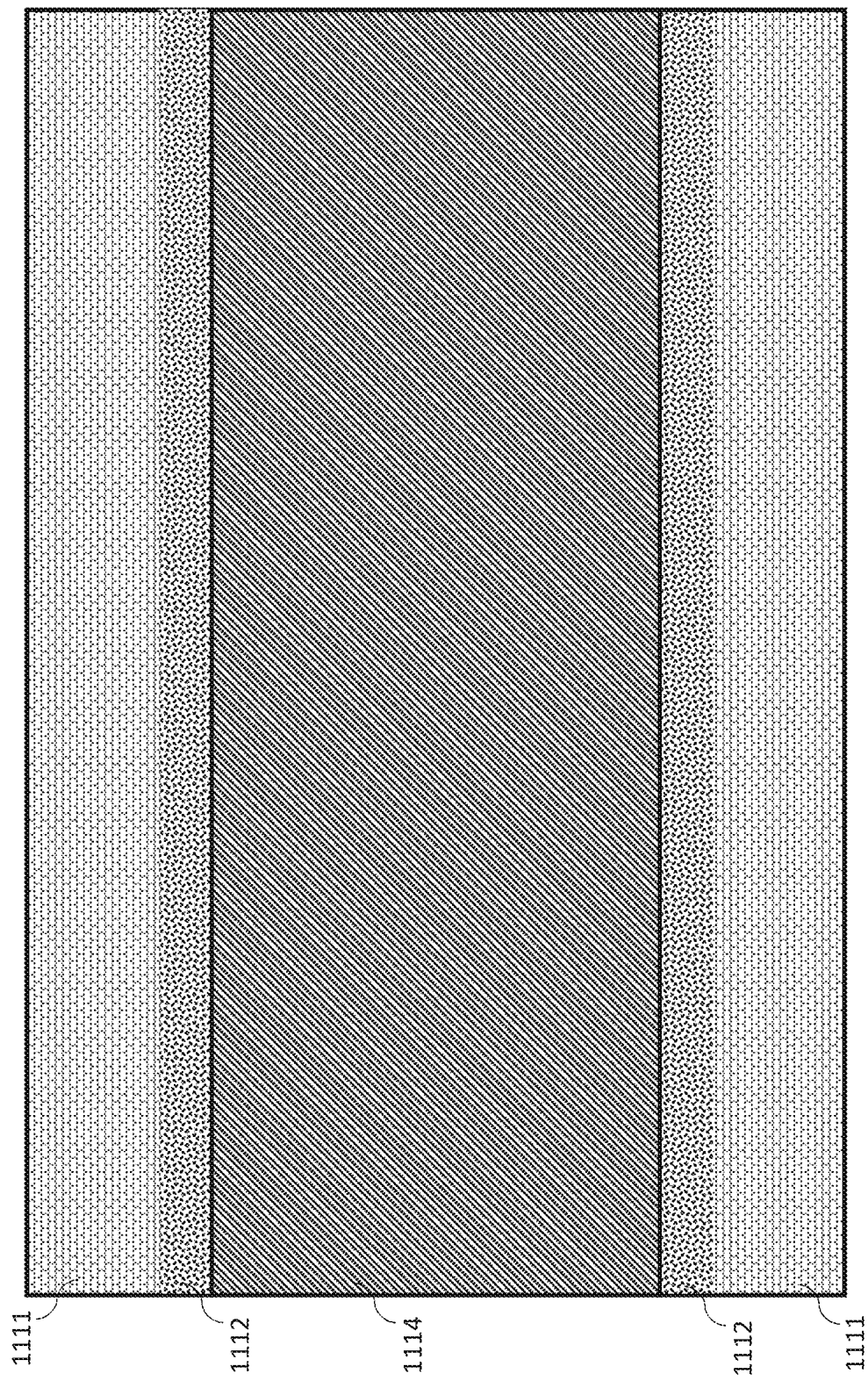

In other preferred aspects, as shown in FIG. 11C, bulk electrode 1114 is first sandwiched by a carbon coating 1112 (which may be a carbon-coated metal foil), and the carbon coating 1112-bulk electrode 1114-carbon coating 1112 sandwich is then further sandwiched by tab 1111. Carbon coating 1112 may be similar in some aspects to thin metal foil 425.

Figure 11D:
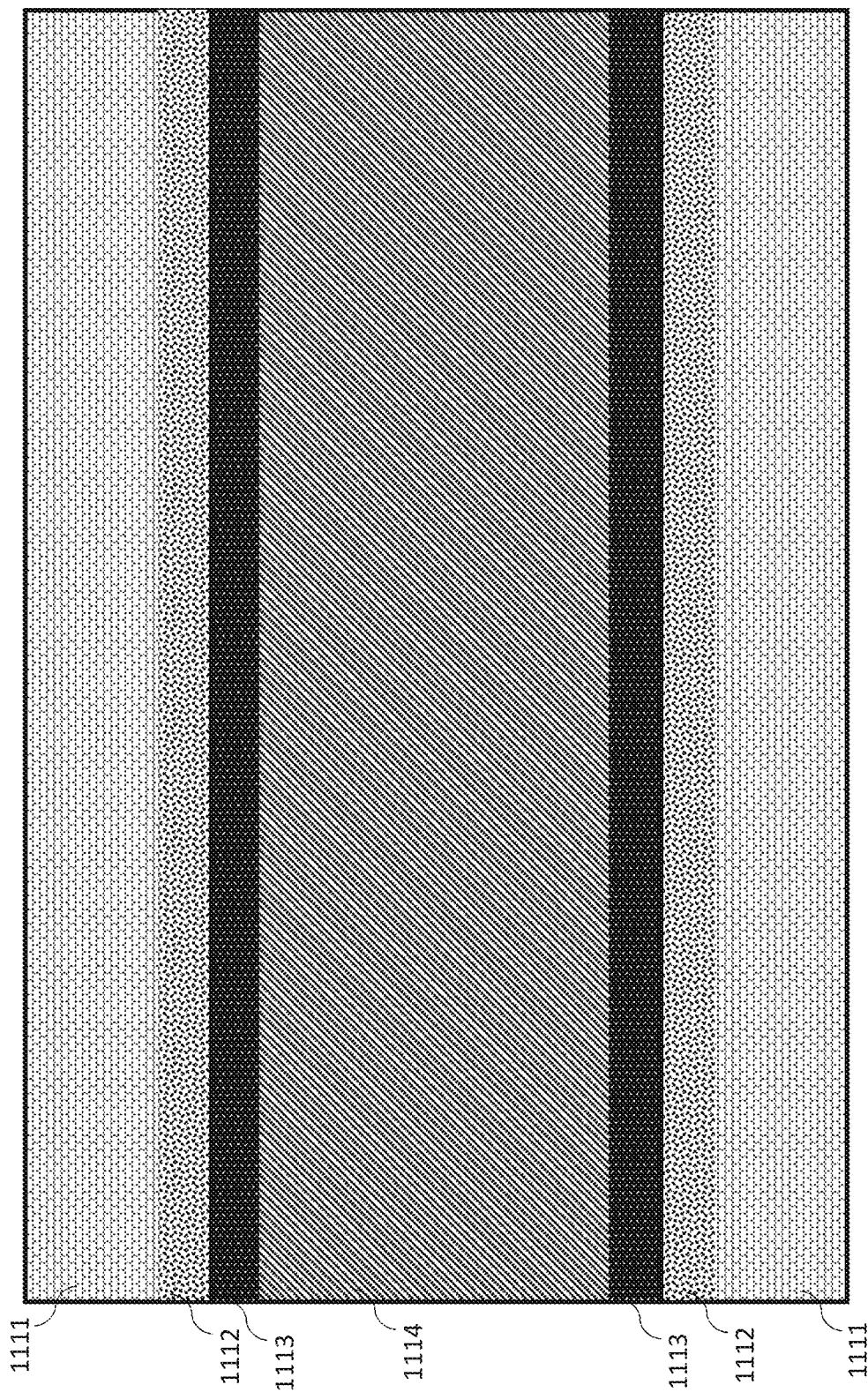

In a more preferred aspect, as shown in FIG. 11D, bulk electrode 1114 is first sandwiched by region 1113, and next by carbon coating 1112 (which may be carbon-coated metal foil), and last by tab 1111.

In the aspects shown in FIGS. 11A-11D, bulk electrode 1114 and region 1113 may be similar in some aspects to member 104, self-standing electrode body 302, self-standing electrode body 310, self-standing electrode body 422, self-standing electrode body 1002, self-standing electrode body 1102, and self-standing electrode body 1202.

Figure 13A:
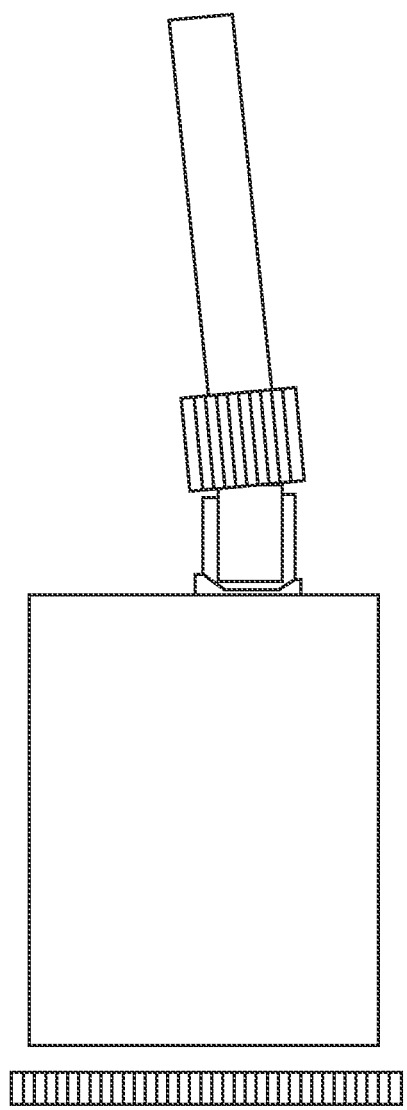
FIGS. 13A and 13B show examples of images of tab attachment according to the aspects depicted in FIG. 1A and FIG. 4A-4D.
Figure 13B:
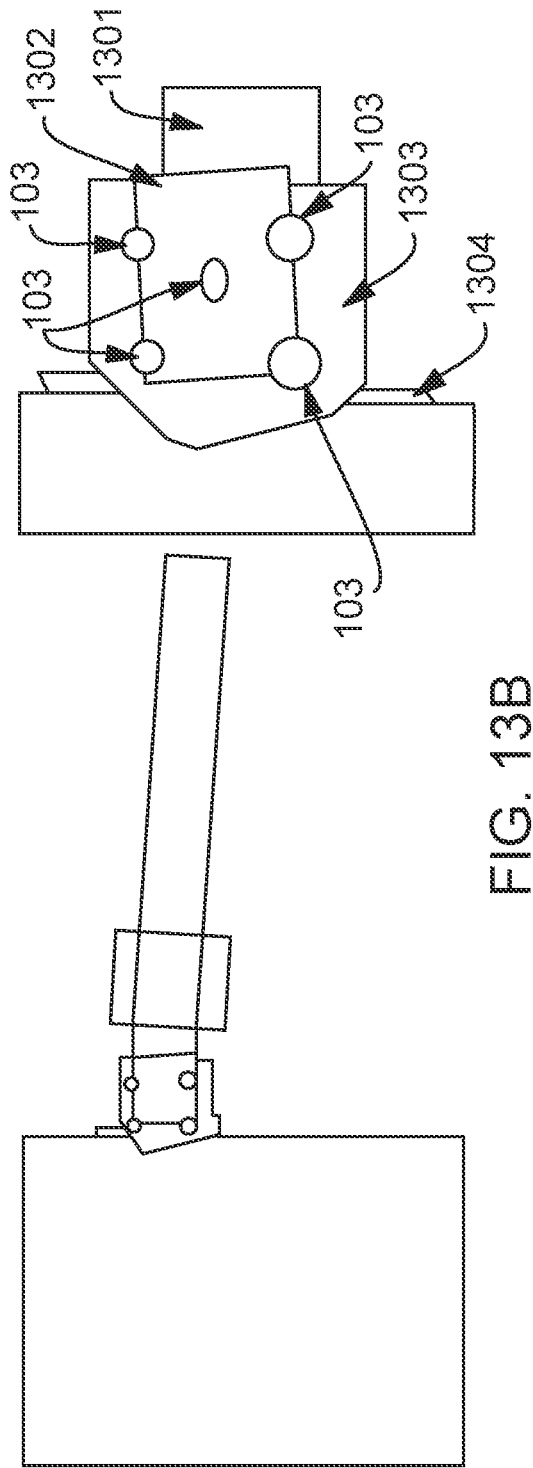

Without wishing to be bound to any particular theory, it is believed to be beneficial to have an increased nanotube content on the faces of the self-standing electrode body (or member protruding therefrom) facing the tab, to improve mechanical adhesion and electrical contact between the tab and the self-standing electrode body (or member protruding therefrom), such as shown in FIG. 11B. It is also believed to be beneficial to have the surface of the tab (or additional sheet of metal) facing the self-standing electrode body (or member protruding therefrom) be carbon-coated, in order to improve mechanical adhesion and electrical contact between the tab and the electrode, such as shown in FIGS. 11C, 13A, and 13B. It is believed to be most beneficial to have the surface of the tab (or additional sheet of metal) facing the self-standing electrode body (or member protruding therefrom) be carbon-coated, and to have an increased nanotube content on the faces of the self-standing electrode body (or member protruding therefrom) facing the tab (or additional sheet of metal) to improve mechanical adhesion and electrical contact between the tab (or additional sheet of metal) and the self-standing electrode body (or member protruding therefrom), as shown in FIG. 11D.

The electrode of the present disclosure may be used in a pouch cell, such as a flexible pouch cell. If the electrode is used in a pouch cell (including flexible pouch cells), the quality of the electrical contact between the tab and the self-standing electrode (as well as mechanical strength of the connection) can be improved if during the pouch cell assembly at least a part of the contact area between the tab and the electrode is positioned in a heat seal of the enclosure, as shown at FIGS. 12A-12D. This can be done either with a pre-made contact described in the above aspects using previously described fasteners (welds, rivets, staples, clips or clamps), or with a tab just folded over the self-standing electrode, and not fastened. In the latter case, the heat seal serves as a fastener.

As will be known to those of ordinary skill in the art, the typical enclosure is made of a polymer-coated metal foil. On one side, the polymer is thermoplastic (commonly—some form of polyethylene), on the other—thermally stable polymer.

Suitable foils include commercially available foils, including but not limited to those described in U.S. Patent Application No. 62/727,922, entitled "Flexible Lithium-Ion Battery," filed on Sep. 6, 2018, which is hereby incorporated by reference herein in its entirety. The cell is assembled such that the thermoplastic polymer sides of the enclosure foils face each other. Then a heat sealer is used. The heat sealer squeezes the two enclosure foils between pre-heated dies, and holds under pressure for a pre-set time. The thermoplastic polymer melts. After the dies are released, the thermoplastic solidifies and holds the enclosure foils together. In the so-called soft seal process, the metal dies are covered with a somewhat soft material, which has enough give to allow sealing tab foils and/or wires into the seal. The typical width of the heat seal is 4-6 mm. When connecting tabs to self-standing electrodes according to the present disclosure, additional squeezing during the heat sealing process will improve the contact between the tab and the electrode, and the solidified thermopolymer will prevent them from separating, as well as prevent lateral movements, which can lead to tab breaking off the electrode. In some cases (especially for thick electrodes and tabs), an additional heat seal polymer (commercially available as a strip) might be required for proper sealing.

Figure 12A:
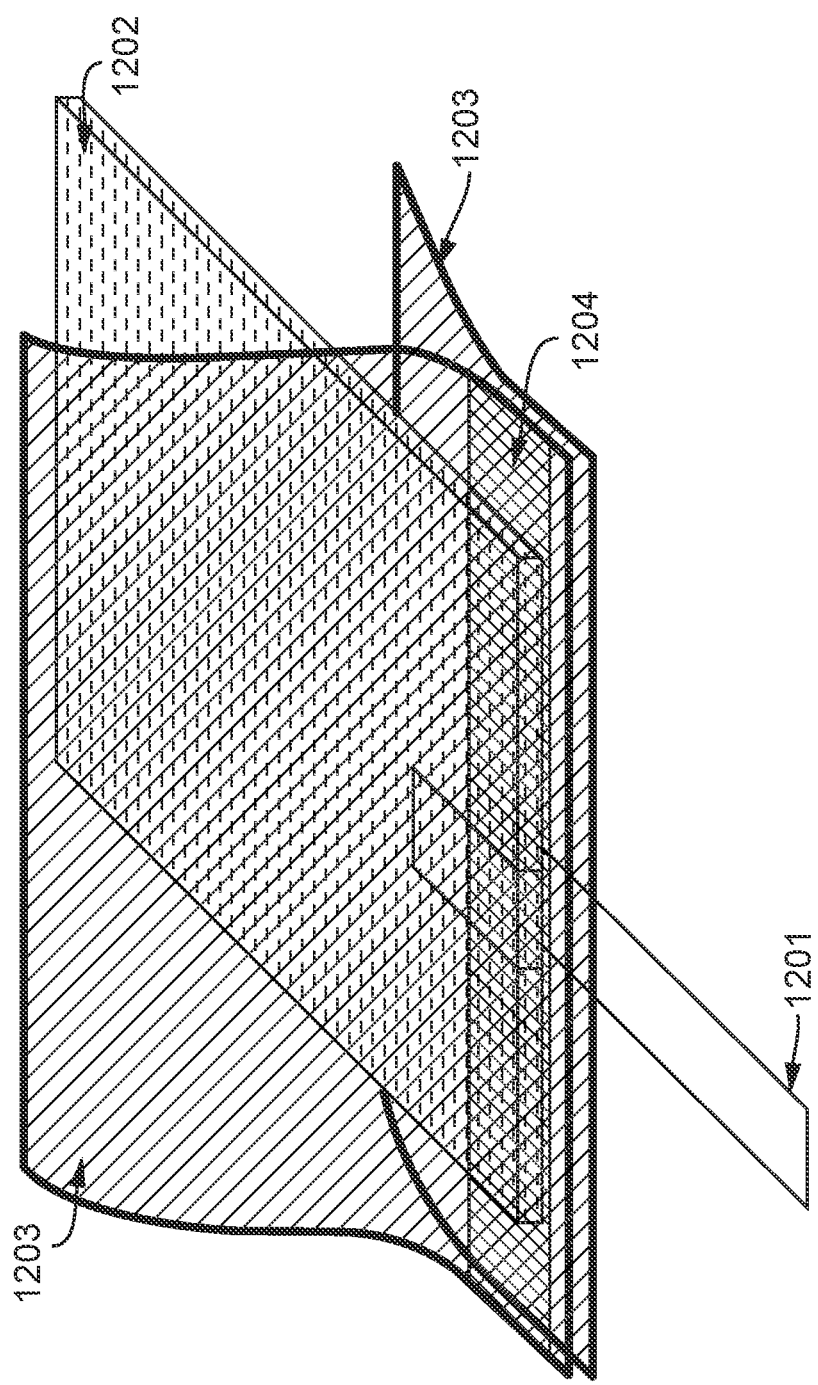
FIGS. 12A-D show different views of schematics of the tab-to-electrode attachment incorporation in the heat seal of the battery enclosure according to various aspects of the present disclosure.
Figure 12B:
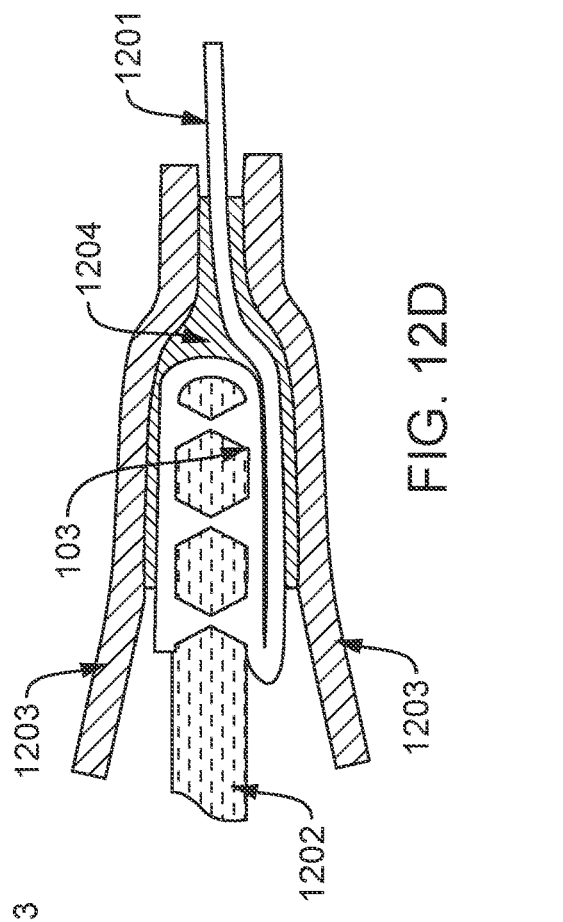
Figure 12D:
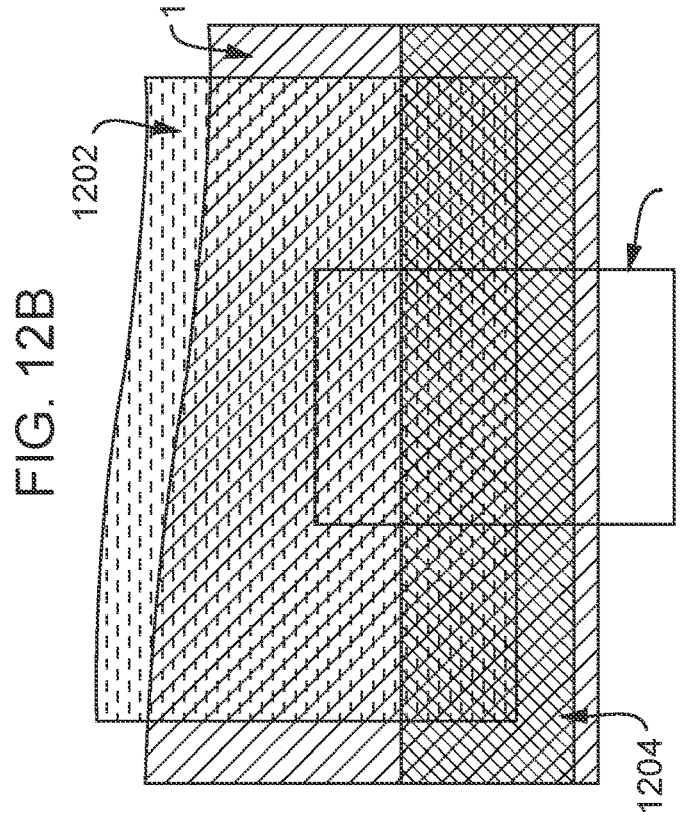
Figure 12C:
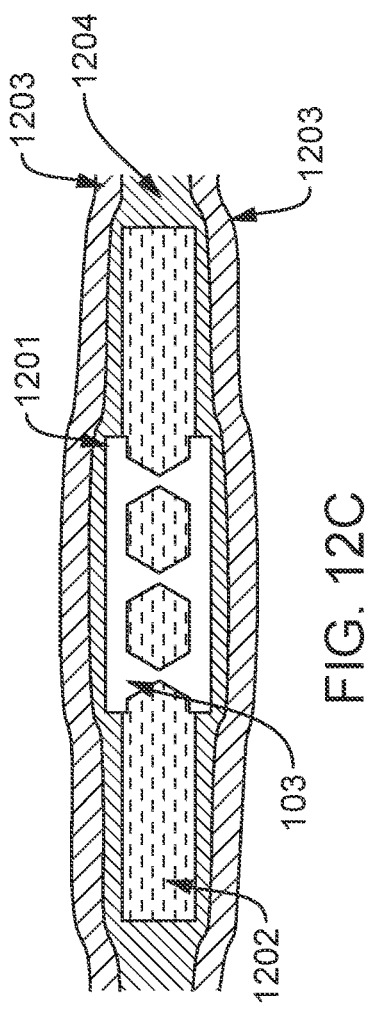

FIGS. 12A-12D show different views of schematics of tab-to-electrode attachment incorporation in the heat seal of the battery enclosure according to various aspects of the present disclosure. In FIG. 12A, self-standing electrode body 1202, with tab 1201 attached, is encased in pouch battery 1203 using heat seal 1204. FIG. 12B shows a top-down view of the view shown in FIG. 12A. The heat seal 1204 may cover all or a portion of the portion of tab 1202 sandwiching electrode 1202. FIG. 12C shows an end-on view of the electrode shown in FIG. 12B, and FIG. 12D shows a side view of the same. As shown in FIGS. 12C-12D, one or more welds 103 through connecting tab 1201 to itself through self-standing electrode body 1202 may be used.

EXAMPLE

A protrusion (a protruding member, also referred to as a "member") of a self-standing electrode can serve as a spot for tab attachment (FIG. 1A). The tab can be attached by squeezing the protrusion between two metal sheets of the tab foil or between the foil folded on itself (FIG. 1B). A spot welding can then be applied through this "sandwich," creating spots where the metal will fully penetrate the electrode material (FIG. 1C). FIGS. 13A-13B show an example of a tab directly attached on a prolonged electrode. It is to be understood that the self-standing electrode and/or the protrusion may or may not include one or more metal strips, wires, or grids embedded therein. Methods for embedding one or more metal strips, wires, or grids in a self-standing electrode include, but are not limited to, those disclosed in U.S. patent application Ser. No. 16/123,872, entitled "Method for Embedding a Battery Tab Attachment in a Self-Standing Electrode without Current Collector or Binder," filed on Sep. 6, 2018, which is incorporated herein by reference in its entirety.

FIGS. 13A and 13B show examples of images of tab attachment according to the aspects shown in FIGS. 1A-1E and 4A-4D The electrodes shown in FIGS. 13A and 13B were made by the same method; the only difference is that the tab was attached to a shorter or a longer edge of the electrode.

The electrodes shown in FIGS. 13A and 13B were prepared using the method described in FIG. 4, using additional layer of carbon-coated foil (133). The only difference between FIGS. 13A and 13B is that in FIG. 13A the protrusion is on a shorter (30 mm) side of the electrode, and in FIG. 13B the protrusion is on the longer (40 mm) side of the electrode. In FIG. 13B, tab 131 is 100 μm thick, 5 mm wide aluminum foil (commercially available), with folded section 132 and foil 133 (15 μm thick foil, carbon-coated on both sides, commercial). Self-standing cathode 134, further contains welds 103. The foil 133 covers most of the protrusion even after the foil was trimmed.

A 15 μm-thick commercially available carbon-coated foil was folded over the edge of the electrode, and all further operations were performed using this "sandwich" structure. The aluminum tab (straight edges, 100 μm thick, 5 mm wide) was then folded over the edge of the "sandwich," and several spot welds were formed through all layers. The tab was then folded outwards from the electrode and secured with additional spot welds. Excess carbon-coated foil was then trimmed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method of making a self-standing electrode, the method comprising:
    aerosolizing or fluidizing an electrode active material to produce an aerosolized or fluidized electrode active material; and
    co-depositing the aerosolized or fluidized electrode active material and carbon nanotubes to form a self-standing electrode; and
    securing a battery tab to the electrode such that each of at least a first face and a second face of the electrode is in contact with the battery tab.

2. The method of claim 1, wherein the securing comprises folding a single sheet of metal over the electrode such that the single sheet is in contact with at least the first face and the second face of the electrode.

3. The method of claim 2, wherein the second face is opposite the first face.

4. The method of claim 2, wherein the securing further comprises connecting the portions of the single sheet that are in contact with the at least two faces of the electrode with each other via one or more welds or rivets through the electrode.

5. The method of claim 1, wherein the co-depositing the aerosolized active material and carbon nanotubes comprises:
    contacting the aerosolized electrode active material powder with the carbon nanotubes in a carrier gas to form a mixture of the carbon nanotubes and the aerosolized electrode active material powder;
    collecting the mixture on the porous surface; and
    removing the carrier gas.

6. The method of claim 1, wherein the overall thickness of the electrode is about 10 μm to about 5000 μm.

7. The method of claim 6, wherein the overall thickness of the electrode is about 20 μm to about 100 μm.

8. The method of claim 1, wherein the securing comprises:

contacting each of two faces of the electrode with a respective metal sheet; and connecting the respective metal sheets to one another via one or more welds, rivets, staples, clamps or clips.

9. The method of claim 1, further comprising the step of, before securing the battery tab to the electrode, shaping the self-standing electrode to form a body and a member extending outward from the body, and wherein the battery tab is secured to the member.

10. The method of claim 1, wherein the co-depositing comprises co-depositing the aerosolized or fluidized electrode active material and carbon nanotubes onto a porous surface to form a binderless self-standing electrode.

* * * * *